United States Patent
Fan et al.

(10) Patent No.: US 11,544,504 B1
(45) Date of Patent: Jan. 3, 2023

(54) DIALOG MANAGEMENT SYSTEM

(71) Applicant: Amazon Technologies, Inc., Seattle, WA (US)

(72) Inventors: Xing Fan, Redmond, WA (US); Hung Tuan Pham, Kirkland, WA (US); Chenlei Guo, Redmond, WA (US); Xiaohu Liu, Bellevue, WA (US); Shuting Tang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 17/022,883

(22) Filed: Sep. 16, 2020

(51) Int. Cl.
*G06K 9/62* (2022.01)
*G06F 16/9032* (2019.01)
*G06F 40/35* (2020.01)

(52) U.S. Cl.
CPC ..... *G06K 9/6257* (2013.01); *G06F 16/90332* (2019.01); *G06F 40/35* (2020.01); *G06K 9/6263* (2013.01)

(58) Field of Classification Search
CPC ............... G06K 9/6257; G06K 9/6263; G06F 16/90332; G06F 40/35
See application file for complete search history.

(56) References Cited

PUBLICATIONS

Gonzalez, Retrieval-based Goal-Oriented Dialogue Generation, 2019, arXiv, whole document (Year: 2019).*
Chen, Semantically Conditioned Dialog Response Generation via Hierarchical Disentangled Self-Attention, 2019, arXiv, whole document (Year: 2019).*
Wang, Multi-Domain Dialogue Acts and Response Co-Generation, 2020, arXiv, whole document (Year: 2020).*

* cited by examiner

*Primary Examiner* — Sonia L Gay
(74) *Attorney, Agent, or Firm* — Pierce Atwood LLP

(57) ABSTRACT

Techniques for determining an intent of a subsequent user input in a dialog are described. The system processes historic interaction data that is structured based on natural language understanding (NLU) hypotheses, with each NLU hypothesis being associated with one or more past user inputs received by the system, one or more sample inputs, and one or more past system responses. Based on processing of the historic interaction data and dialog data of previous turns of the dialog, the system determines candidate intents for the subsequent turn of the dialog. The system also uses context data to determine the candidate intents.

20 Claims, 14 Drawing Sheets

DIALOG MANAGEMENT SYSTEM

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
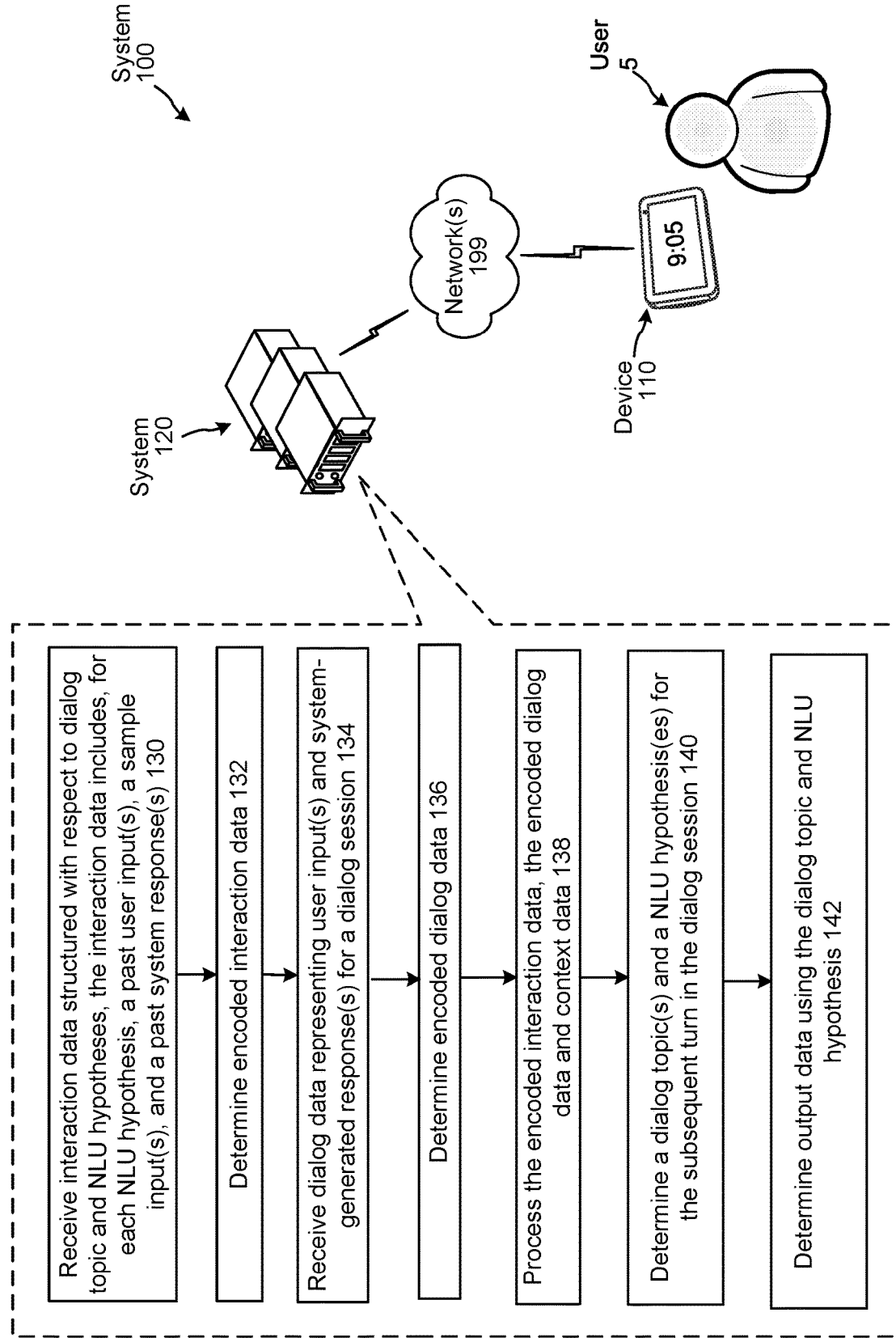
FIG. 1 is a conceptual diagram illustrating a system configured determine an intent of a subsequent turn of a dialog, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) component of a system. Text-to-speech (TTS) is a field of computer science concerning transforming textual and/or other data into audio data that is synthesized to resemble human speech.

Certain systems may be configured to perform actions responsive to user inputs. For example, for the user input of "Alexa, play music by <Artist>," a system may output music sung by the Artist. For further example, for the user input of "Alexa, tell me about events near me," a system may output synthesized speech representing event information for a geographic location of the user. In a further example, for the user input of "Alexa, book a taxi for me," a system may, via a taxi booking application, book a taxi for the user.

The system may also be configured to respond to the user across multiple exchanges between the user and the system. For example, the user may ask the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system responses, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation.

A user input and performance by the system of a corresponding action responsive to the user input (a system-generated response), may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the dialog session identifier or other data to track the progress of the dialog to select system responses in a way that tracks the previous user-system exchanges, thus moving the dialog along in a manner that results in a desirable user experience.

The present disclosure relates to techniques for predicting a dialog goal and predicting information the user may be interested in based on the previous turns of the dialog. For example, for the user input "book a flight to Miami for next Sunday," the system may determine that the user may ask for events in Miami for next Sunday or that the user may find information on events in Miami for next Sunday useful. Based on that determination, after booking the flight, the system may respond "would you like to hear about events taking place in Miami next Sunday?" The system may predict what information may be of interest to the user in the form of a NLU hypothesis that may include an intent and one or more entities.

The system of the present disclosure may determine one or more NLU hypotheses corresponding to a potential user input for a subsequent turn in the dialog. To predict the one or more NLU hypotheses, the system employs a two-stage processing system. In the first stage, the system may process historic interaction data that is indexed based on NLU hypotheses and dialog data (representing user inputs and system-generated responses for previous turns of the dialog) to determine a list of candidate NLU hypotheses. For example, the historic interaction data may include a first document corresponding to a first NLU hypothesis (e.g., data representing domain: Music; intent: PlayQueueIntent) that includes past user inputs received by the system corresponding to the first NLU hypothesis, a sample input (provided by a developer, for example) and system-generated responses to the past user inputs. The first document may also include data representing the number of times the past user input was received and the number times of the past user input resulted in a defect.

As used herein, a defect refers to the system generating an undesired response to a user input due to, for example, system processing errors, misunderstanding what the user said, misunderstanding what the user meant, etc. For the user input "play my music from ten years ago," the undesired response by the system may be playing the wrong music (e.g., misunderstanding "my"), outputting "I am sorry I don't understand the request," or responding with silence. The sample input included in the first document represents an input corresponding to the first NLU hypothesis, processing of which results in a desired response by the system.

During the first stage of processing, the list of candidate NLU hypotheses are generated using historic interaction data representing interactions between multiple different users and the system (e.g., global-level interaction data), historic interaction data representing interactions between the user engaged in the instant dialog and the system (e.g., user-level interaction data), and historic interaction data representing interactions between a group of users (with similar profiles to a profile of the instant user) and the system (e.g., cohort-level interaction data).

In the second stage of processing, the list of candidate NLU hypotheses determined during the first stage are processed and ranked, in view of context data corresponding to the dialog. The second stage of processing results in selection of one NLU hypothesis or a ranked list of NLU hypotheses that may be provided to downstream components. The downstream components may select one of the predicted NLU hypotheses to generate an output for the user.

Aspects of the present disclosure improve the user experience by enabling a system to predict the user's next input in a dialog and enable the system to offer information to the user related to the dialog.

FIG. 1 illustrates a system 100 configured to determine an intent for a subsequent turn in an on-going dialog. Although the figures and discussion of the present disclosure illustrate certain steps in a particular order, the steps described may be performed in a different order (as well as certain steps removed or added) without departing from the present disclosure. As shown in FIG. 1, the system 100 may include a device 110 (local to a user 5) in communication with a system 120 across one or more networks 199. The network(s) 199 may include a local or private network, or may include a wide network such as the Internet.

The system 120 receives (130) interaction data structured with respect to dialog topics and NLU hypotheses, where the interaction data includes, for each NLU hypothesis, a past user input(s), a sample input(s) (e.g., provided by a system/application/skill developer and representing an input that resolves to the particular NLU hypothesis and causes the system 120 to output a desired response), and a past system response(s) corresponding to a NLU hypothesis. Each NLU hypothesis may also be associated with a dialog topic. The interaction data may be structured such that first data of the interaction data corresponds to a first dialog topic and a first NLU hypothesis, and may include at least one past user input corresponding to the first NLU hypothesis. The first data may also include a number of times the past user input(s) was received by the system 120 from multiple different users. The number of times a past user input was received may be determined by aggregating each time a user (user 5 and other users of the system 120) provide the past user input. The first data may also include at least one sample input corresponding to the first NLU hypothesis, at least one past system response corresponding to the first NLU hypothesis and a number of times the past system response(s) was outputted by the system 120. The first data may also include a number of times the past user input(s) resulted in a defect, and a number of times the past system response(s) resulted in an undesired response. Second data of the interaction data may correspond to a second dialog topic and a second NLU hypothesis, and include similar data corresponding to the second NLU hypothesis.

In some embodiments, the interaction data may include other types of statistics/metrics corresponding to the past user input(s) and the past system response(s), for example, a satisfaction rating/feedback rating provided by multiple different users of the system 120. The satisfaction rating/feedback rating may indicate the users' satisfaction with the past system response when provided in response to the past user input. The satisfaction/feedback ratings from multiple users may be aggregated using various techniques (e.g., average, summation, statistical/regression algorithms, etc.). The satisfaction/feedback rating may be determined using various techniques, for example, by processing explicit feedback provided by the user (spoken feedback, button push, inputs via touch screen or other device interfaces, etc.), where the explicit feedback may be solicited by the system 120, or the user may ask the system 120 to cancel system processing or stop outputting a response to the user input. The satisfaction/feedback rating may also be determined by processing implicit feedback provided by the user such as verbal cues (e.g., sighing), visual cues (e.g., shaking head), and sentiment associated with the user input or in response to the system output. The system 120 may process image data representing the user's reaction to the system output. The system 120 may perform sentiment detection to determine the user's sentiment in response to the system output (e.g., the user may be angry, disappointed, happy, etc.). The system 120 may also determine the satisfaction/feedback rating based on the user rephrasing or repeating the user input, indicated that the system's previous response was undesired/unsatisfactory. The explicit and implicit feedback may be represented as a numerical value.

Based on the statistics/metrics associated with the past user inputs and past system responses (such as number of times received/outputted, number of defects caused, satisfaction/feedback rating, etc.) for different dialog topics and NLU hypotheses, the system 120 may select a dialog topic or NLU hypothesis that caused fewer defects and/or is more popular/satisfactory over other dialog topics or NLU hypotheses.

The system 120 determines (132) encoded interaction data. For example, the system 120 may process the first data using an encoder to determine encoded first data and process the second data using an encoder (which may be the same or a different encoder than the encoder used to process the first data) to determine encoded second data. The encoded first data and the encoded second data may be stored as the encoded interaction data.

The system 120 receives (134) dialog data representing a user input(s) and a system-generated response(s) for a dialog session. The dialog session may be an on-going dialog exchange between the user 5 and the system 120. The user 5 may provide one or more user inputs (e.g., spoken inputs, text-based inputs, or other forms of inputs corresponding to natural language inputs) during a dialog with the system 120. In response to the user inputs, the system 120 may output a system-generated response (e.g., a synthesized speech output, displayed text, or other forms of outputs). During a first turn of the dialog, the user 5 may provide a first user input and the system 120 may output a first system-generated response; during a second turn of the dialog, the user 5 may provide a second user input and the system 120 may output a second system-generated response; and so on. The dialog data may include representations of the first user input, the first system-generated response, the second user input and the second system-generated response, representing the dialog exchange that has taken place so far.

The system determines (136) encoded dialog data. The system 120 may determine encoded dialog data using the dialog data. In some embodiments, the system 120 may determine encoded dialog data based on encoding each word of the dialog data and data corresponding to each word. The word may be represented by text data or by token data (determined by the ASR component 250). The data corresponding to each word may represent (1) an identity tag identifying whether the word corresponds to a user input or a system-generated response, (2) a turn tag identifying which turn of the dialog the word corresponds to, and (3) position data identifying where in the user input/system-generated response the word appears. In other embodiments, the system 120 may determine encoded dialog data based on encoding words of each dialog turn, and processing the encoded turn data to determine the encoded dialog data.

The system 120 processes (138) the encoded interaction data, the encoded dialog data and context data. The context data may include device information (corresponding to the device 110), user information (corresponding to the user 5), location information corresponding to the device 110/user 5, and/or time information corresponding to when the dialog is taking place. In some embodiments, the context data may also be encoded. The system 120 may employ a component/trained model to process the encoded interaction data, encoded dialog data and the (encoded) context data. The component/trained model may be configured/trained using past dialog session data including past dialog turns (user input and system-generated response to the user input). The past dialog session data may represent how users interact with the system 120 and how dialogs progress between users and the system 120. Using the past dialog session data, the component/trained model may determine what users are interested in or what information the users may find useful based on what the users tend to say in subsequent dialog turns. The component/trained model may be configured to determine a semantic similarity between the interaction data and the dialog data to identify which user input the user already provided in the instant dialog and, based on that, what the user may be interested in next.

The component/trained model may employ a two-stage processing technique as described in detail below. The system 120 determines (140) a list of dialog topics and NLU hypotheses for a subsequent turn of the dialog session. The list of NLU hypotheses may correspond to a potential user input for the next turn in the dialog. The list of NLU hypotheses may correspond to information that the user 5 may find useful based on how the dialog is progressing. A NLU hypothesis may include an intent and one or more entities. In some embodiments, the list may include an intent or one or more entities (rather than a NLU hypothesis). The system 120 may process the list and context data corresponding to the dialog session to determine a dialog topic or NLU hypothesis(es) for the subsequent turn. Based on the context data, the system 120 may rank the list of NLU hypotheses or generate another NLU hypothesis corresponding to the subsequent turn. The subsequent turn of the dialog session may refer to a user input provided by the user in the instant dialog, in which case the determined dialog topic(s) and NLU hypothesis(es) may correspond to a predicted user input. The subsequent turn of the dialog session may refer to an output by the system 120 that is proactively presented to the user during the dialog session. Such an output may not be in response to a specific user input, but may correspond to the dialog (based on the previous user inputs in the dialog session or related to an overall dialog topic).

In a non-limiting example, the user 5, in an on-going dialog, may provide the user input "purchase a plane ticket from Boston to Miami for Tuesday morning," (first turn of the dialog). The system 120, in response, may cause another system to purchase the indicated ticket, and may output the system-generated response "your flight is booked with the confirmation code <code>" (first turn of the dialog). The system 120, as described above, may process encoded dialog data representing the foregoing user input and system-generated response, along with the encoded interaction data and context data for the instant dialog, and determine that the dialog topic for the instant dialog is "Travel" or "Book Flight". The system 120 may also determine that NLU hypotheses corresponding to travel, weather, or event information may be relevant to the dialog session, and/or that the location entity "Boston" and "Miami" may be relevant to the dialog session. Based on these determinations, the system 120 may select from various potential outputs for the subsequent turn in the dialog, where the potential outputs may correspond to weather information for Boston on Tuesday, weather information for Miami on Tuesday, events information for Miami on Tuesday or other days during the travel period, etc. The system 120 may then (proactively) output "would you like to hear about the events in Miami on Tuesday?"

Other user inputs received by the system 120 may correspond to the device 110 including (or otherwise be associated with) a camera that captures a sequence of images representing the user 5 performing a gesture. The device 110 may send image data (representing the sequence of images) and/or an indication of the gesture performed to the system 120, and the system 120 may determine the gesture corresponds to a particular natural language user input. In a further example, the device 110 may include (or otherwise be associated with) a motion sensor configured to detect motion. When the device 110 detects motion, the device 110 may send data representing the detected motion to the system 120, and the system 120 may determine the detected motion corresponds to a particular natural language user input. In another example, the device 110 may include a button or display a virtual button, and the device 110 may detect the user 5 interacting with the button. The user 5 may interact with the button in various manners, such as a single quick press, a single long press, a double tap, a roaming touch input in a particular direction, etc. The device 110 may send data representing the detected button interaction to the system 120, and the system 120 may determine the button interaction corresponds to a particular natural language input.

A system may be configured to incorporate user permissions and may only perform activities disclosed herein if approved by a user. As such, the systems, devices, components, and techniques described herein are configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system, the device and/or user are located.

Figure 2:
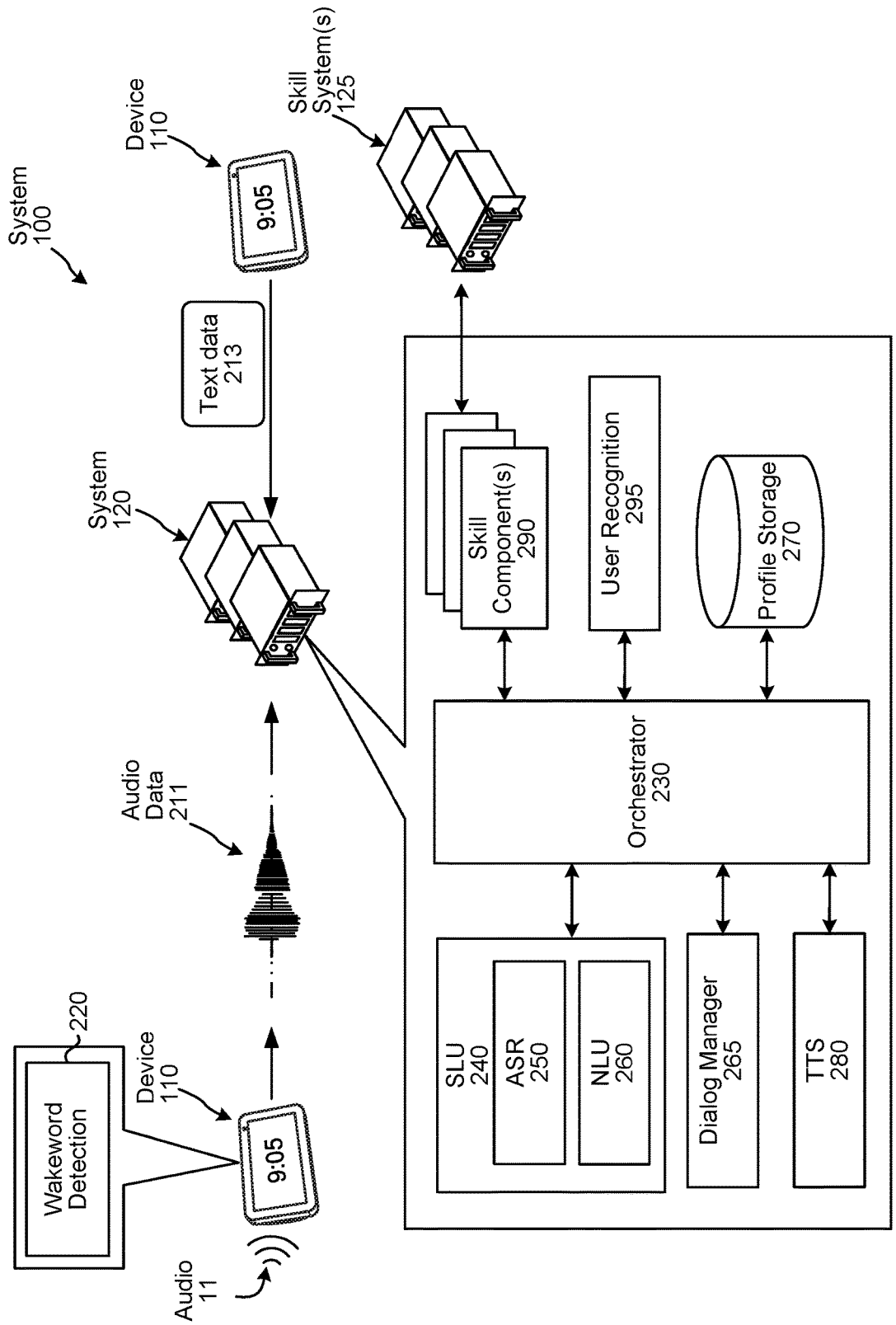
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented using techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once the device 110 detects speech in audio data representing the audio 11, the device 110 may use a wakeword detection component 220 to perform to determine when the user 5 intends to speak an input to the device 110. The device 110 may be configured to detect various wakewords. In at least some examples, each wakeword may correspond to a different digital assistant. In at least some examples, a wakeword may correspond to a name of a digital assistant. Example wakewords include, but are not limited to, Alexa, echo, Amazon, and computer.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 220 detects a wakeword, the device 110 may "wake" and begin transmitting audio data 211, representing the audio 11, to the system 120. The audio data 211 may include data corresponding to the detected wakeword, or the device 110a may remove the portion of the audio corresponding to the detected wakeword prior to sending the audio data 211 to the system 120.

The system 120 may include an orchestrator component 230 configured to receive the audio data 211 from the device 110. The system 120 may include a spoken language understanding (SLU) component 240 configured to perform spoken language processing. As used herein, spoken language processing may refer to NLU processing, or a combination of ASR processing and NLU processing. In some embodiments, the SLU component 240 may employ one or more ML models that are configured to process audio data and determine, directly from the audio data, the meaning of the user input (e.g., intent and slot data). In other embodiments, the SLU component 240 may include an ASR component 250 that is configured to process audio data to determine ASR data (e.g., text data or token data) representing what the user said, and a NLU component 260 that is configured to process the ASR data to determine NLU data (e.g., intent and slot data).

The orchestrator component 230 may send the audio data 211 to an ASR component 250 that transcribes the audio data 211 into ASR output data including one or more ASR hypotheses. ASR output data may include one or more textual interpretations (corresponding to one or more ASR hypotheses), or may be configured in another manner, such as a token. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The ASR output data (output by the ASR component 250) may be input to a NLU component 260. The NLU component 260 attempts to make a semantic interpretation of the phrase(s) or statement(s) represented in the ASR output data. That is, the NLU component 260 determines one or more meanings associated with the phrase(s) or statement(s) represented in the ASR output data based on words represented in the ASR output data. The NLU component 260 determines an intent representing an action that a user desires be performed as well as pieces of the spoken input that allow the device 110 (or other device), the system 120, a skill system 125, etc. to execute the intent. For example, if the ASR output data corresponds to "play Adele music," the NLU component 260 may determine a <PlayMusic> intent and may identify "Adele" as an artist. For further example, if the ASR output data corresponds to "what is the weather," the NLU component 260 may determine an <OutputWeather> intent. In another example, if the ASR output data corresponds to "turn off the lights," the NLU component 260 may determine a <DeactivateLight> intent. The NLU component 260 may output NLU output data (which may include one or more intent indicators that are each associated with one or more portions of tagged text data).

As described above, the system 120 may implement the SLU component 240 as two different components (i.e., the ASR component 250 and the NLU component 260). In at least some embodiments, the SLU component 240 may be implemented as a single component equivalent to a combination of the ASR component 250 and the NLU component 260. In such embodiments, the SLU component 240 may process the audio data 211 and directly generate NLU output data, without an intermediate step of generating ASR output data. As such, the SLU component 240 may take audio data 211 representing speech and attempt to make a semantic interpretation of the speech.

The system 120 may include one or more skill components 290. A skill component 290 may be software running on the system 120 that is akin to a software application running on a traditional computing device. That is, a skill component 290 may enable the system 120 to execute user commands involving specific functionality in order to provide data or produce some other requested output. A skill component 290 may operate in conjunction between the system 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components.

A skill component 290 may be configured to execute with respect to NLU output data. For example, for NLU output data including a <GetWeather> intent, the system 120 (and more particularly the orchestrator component 230) may invoke a weather skill component to determine and output weather information for a geographic location represented in a user profile or corresponding to a location of the user device 110 that captured the spoken input. For further example, for NLU output data including a <BookRide> intent, the system 120 (and more particularly the orchestrator component 230) may invoke a taxi skill component may book a requested ride. In another example, for NLU output data including a <BuyPizza> intent, the system 120 (and more particularly the orchestrator component 230) may invoke a restaurant skill component to place an order for a pizza. A skill component 290 may operate in conjunction between the system 120 and other devices, such as the device 110, restaurant electronic ordering systems, taxi electronic booking systems, etc. in order to complete certain functions.

A skill component 290 may be associated with a domain, a non-limiting list of which includes a smart home domain, a music domain, a video domain, a weather domain, a communications domain, a flash briefing domain, a shopping domain, and a custom domain.

The functionality described herein as a skill component 290 may be referred to using many different terms, such as an action, bot, app, application, or the like.

In at least some embodiments, a skill component 290 may perform an action by interacting with a skill system 125, which may include one or more databases, other software, and/or the like. For example, a skill component 290 may send an instruction to a skill system 125 to execute specific functionality in order to provide data or perform some other action requested by the user 5. In some examples, a skill component 290 may send a request for data (e.g., request for information) to a skill system 125 and may receive the requested data from the skill system 125, enabling the skill component 290 to perform an action requested by the user 5. In other examples, a skill component 290 may send an instruction to the skill system 125 and the skill system 125 may perform the action requested by the user 5. For example, a weather skill system may enable the system 100 to provide weather information, a car service skill system may enable the system 100 to book a trip with respect to a taxi or ride sharing service, a restaurant skill system may enable the system 100 to order a pizza with respect to the restaurant's online ordering system, etc.

The system 120 may communicate with a skill system 125 via Hypertext Transfer Protocol (HTTP) or HTTPS over one or more computer networks such as the network(s) 199, although the disclosure is not limited thereto. Communication between the system 120 and a skill system 125 may occur over one or more third-party network; that is, a computer network maintained by a provider not associated with the system 120 or the skill system 125 other than by use of the third-party network.

Additionally or alternatively, a skill component 290 may be implemented by a device 110. This may enable the device 110 to execute specific functionality in order to provide data or perform some other action requested by the user 5. The device 110 can host a skill component 290 in the form of an application executing on the device 110. Such a device 110 can be, for example, a mobile device 110 on a mobile network or a local area network (LAN).

The system 120, skill system 125, and/or device 110 may each host or otherwise execute instances of same or different skills. In some cases, a single skill—for example, a music skill— may have instances executing on more than one of the system 120, skill system 125, and/or device 110. For example, a skill system 125 may host a default instance of a skill while a device 110 hosts a personal instance of the skill. The personal instance of the skill may be a skill instance under development or test on a machine local to and/or operated by a skill developer. In another example, the system 120 may host a default instance of a skill while the device 110 hosts a personal instance of the skill in the form of an application executing on the device 110.

The system 120 may include a TTS component 280 that generates audio data (e.g., synthesized speech) from text data using one or more different methods. Text data input to the TTS component 280 may come from a skill component 290, a skill system 125, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to spoken inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skill components 290/skill systems 125 that the user has enabled. When a user enables a skill component 290/skill system 125, the user is providing the system 120 with permission to allow the skill component 290/skill system 125 to execute with respect to the user's spoken inputs. If a user does not enable a skill component 290/skill system 125, the system 120 may not invoke the skill component 290/skill system 125 to execute with respect to the user's spoken inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data (such as input/output capabilities). A device profile may also include one or more user identifiers, corresponding to one or more user profiles associated with the device profile. For example, a household device's profile may include the user identifiers of users of the household.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language user input, to stored biometric data of users. The user recognition component 295 may additionally or alternatively perform user recognition by comparing image data (e.g., including a representation of at least a feature of a user), received by the system 120 in correlation with a natural language user input, with stored image data including representations of features of different users. The user recognition component 295 may perform other or additional user recognition processes, including those known in the art. For a particular natural language user input, the user recognition component 295 may perform processing with respect to stored data of users associated with the device 110 that captured the natural language user input.

The user recognition component 295 determines whether a natural language user input originated from a particular user. For example, the user recognition component 295 may generate a first value representing a likelihood that a natural language user input originated from a first user, a second value representing a likelihood that the natural language user input originated from a second user, etc. The user recognition component 295 may also determine an overall confidence regarding the accuracy of user recognition processing.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill, as well as processing performed by other components of the system 120 and/or other systems.

The system 120 may also include a dialog manager 265 configured to track a dialog between the user 5 and the system 120, including, for example, the user input and corresponding system-generated response to the user input for each turn. The dialog manager 265 may associate a dialog session identifier with the user inputs and system-generated responses during a dialog session. The user inputs may be determined to be part of the same dialog session based on the time elapsed between the user inputs, based on the time elapsed between the system-generated response and a subsequent user input, and/or based on other data corresponding to the user 5/the device 110. The dialog manager 265, in some embodiments, may also be configured to predict the next user input, in terms of a NLU hypothesis (domain, intent, slot values) in the dialog, as described in relation to FIG. 4.

Figure 3:
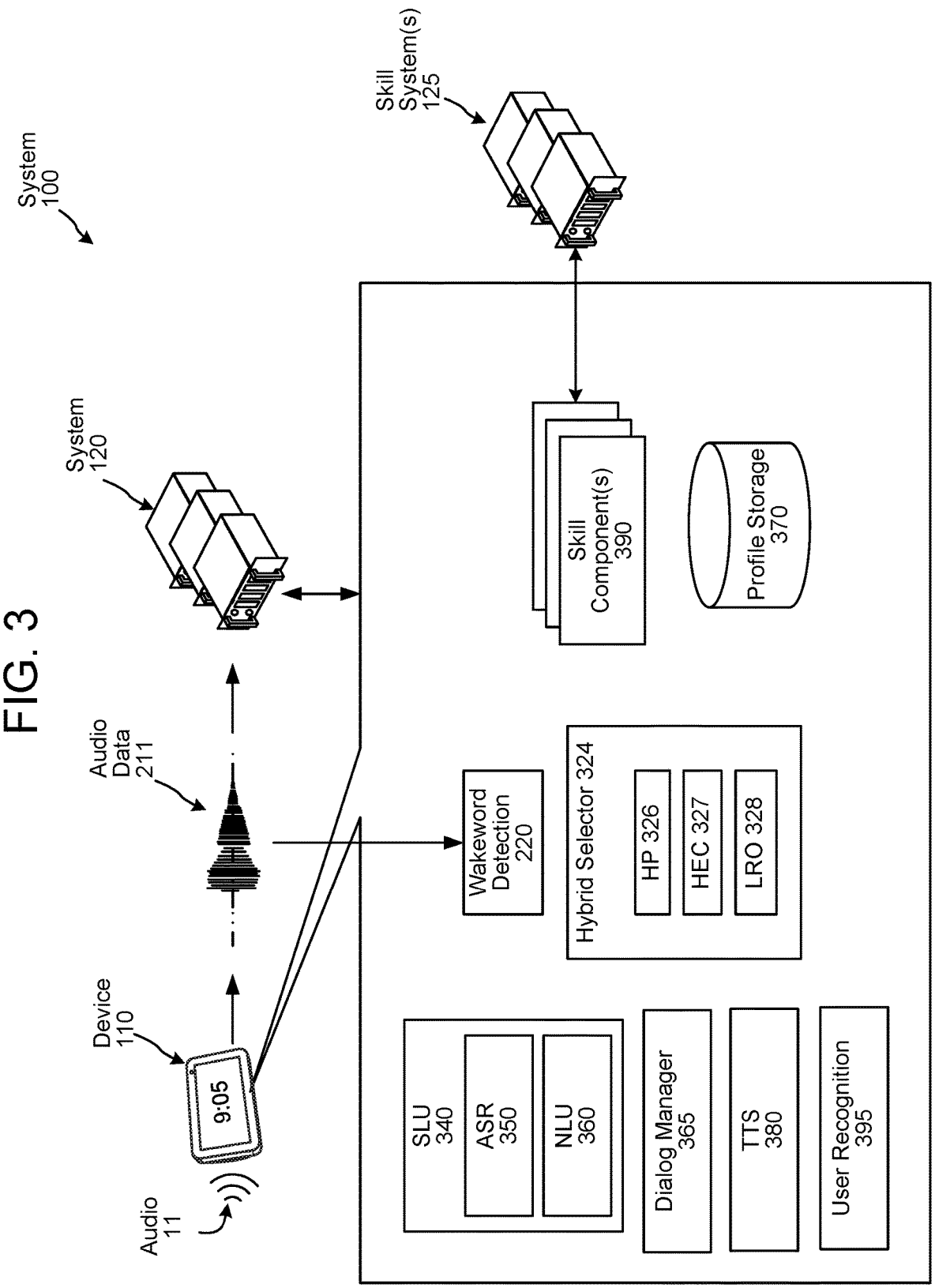
FIG. 3 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing of the system 120 described above. FIG. 3 illustrates the system 100 as it may be configured to include a device 110 capable of performing speech processing and sensitive data processing. Optimizing the utilization of on-device computing resources (e.g., processing resources, etc.) of the device 110, in at least some situations, can reduce latency so that the user experience with the device 110 is not negatively impacted by local processing tasks taking too long.

In general, the device 110 may be capable of capturing utterances with a microphone(s) and responding in various ways, such as by outputting content (e.g., audio) via an output device(s), which may be loudspeaker(s), a display(s), or any other suitable output component. In addition, the device 110 may be configured to respond to user speech by controlling one or more other devices that are co-located in an environment with the device 110, such as by sending a command to a second device via an input/output communications interface (e.g., a short range radio), the command instructing an operation to be performed at the second device (e.g., to turn on/off a smart light in the environment).

In addition to using a built-in microphone(s) to capture spoken inputs and convert them into digital audio data, a first device 110a may additionally or alternatively receive audio data from a second device 110b in the environment, such as when the second device 110b captures a spoken input from the user 5 and sends the audio data to the first device 110a. This may occur in situations where the second device 110b is closer to the user 5 and would like to leverage the processing capabilities of the first device 110a.

The device 110 may operate in conjunction with and/or under the control of a remote, network-based or network-accessible control system (e.g., the system 120). The system 120 may, in some examples be part of a network-accessible computing platform that is maintained and accessible via one or more network(s) 199 such as a wide area network. Network-accessible computing platforms such as this may be referred to using terms such as "on-demand computing", "software as a service (SaaS)", "platform computing", "network-accessible platform", "cloud services", "data centers", and so forth. The system 120 may be configured to provide particular functionality to large numbers of local (e.g., in-home, in-car, etc.) devices 110 of different users. The network(s) 199 is representative of any type of public or private, wide-area network, such as the Internet, which extends beyond the environment of the device 110. Thus, the wide area network may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies. In contrast, the device 110 and other local devices (located in the same environment as the device 110) may be connected to a private network associated with the environment (e.g., home, business, etc.), and the devices may communicate with the network(s) 199 via the private network.

In at least some embodiments, the system 120 may be configured to receive the audio data 211 from the device 110, to recognize speech corresponding to a spoken input in the received audio data 211 using a SLU component 240 (which may be referred to as a speech processing system), and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to the user 5's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining a NLU result (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or the local language processing component 340 (in which case the system 120 and the local language processing component 340 may process the audio data 211 in parallel, or at least partially in parallel, although the disclosure is not limited thereto). The wakeword detection component 220 may also send an indication, to the hybrid selector 324, representing a wakeword was not detected. In response to receiving such an indication, the hybrid selector 324 may refrain from sending the audio data 211 to the system 120, and may prevent the local language processing component 340 from further processing the audio data 211. In this situation, the audio data 211 can be discarded.

The device 110 may conduct its own speech processing using on-device language processing components, such as an ASR component 350 and an NLU 360, similar to the manner discussed above with respect to the ASR component 250 and the NLU component 360 of the system 120. The device 110 may also internally include, or otherwise have access to, other components such as one or more skill components 390 capable of executing commands based on NLU results or other results determined by the device 110, a user recognition component 395 (configured to process in a similar manner to that discussed above with respect to the user recognition component 295 of the system 120), profile storage 370 (configured to store similar profile data to that discussed above with respect to the profile storage 270 of the system 120), or other components. In at least some embodiments, the profile storage 370 may only store profile data for a user or group of users specifically associated with the device 110. Similar to as described above with respect to FIG. 2, a skill component 390 may communicate with a skill system(s) 125.

As used herein, "skill" may refer to the skill component 290 or the skill system 125 or a combination of the skill component 290 and the skill system 125.

The device 110 may also include a dialog manager 365 that may be similar to the dialog manager 265 described above with respect to FIG. 2.

In at least some embodiments, the on-device language processing components may not have the same capabilities as the language processing components of the system 120. For example, the on-device language processing components may be configured to handle only a subset of the spoken inputs that may be handled by the system 120. For example, such subset of spoken inputs may corresponding to local-type spoken inputs, such as those controlling devices or components associated with a user's home. In such circumstances the on-device language processing components may be able to more quickly interpret and respond to a local-type spoken input, for example, than processing that involves the system 120. If the device 110 attempts to process a spoken input for which the on-device language processing components are not necessarily best suited, the language processing results generated by the device 110 may indicate a low confidence or other metric indicating that the processing by the device 110 may not be as accurate as the processing done by the system 120.

The hybrid selector 324, of the device 110, may include a hybrid proxy (HP) 326. The HP 326 can be implemented as a layer within a voice services component 322 and may be configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the local language processing component 340 about the availability of new audio data 211 that represents user speech, and to otherwise initiate the operations of the local language processing component 340 when new audio data 211 becomes available. In general, the hybrid selector 324 may control execution of the local language processing component 340, such as by sending "execute" and "terminate" events/instructions to the local language processing component 340. An "execute" event may instruct the local language processing component 340 to continue any suspended execution based on the audio data 211 (e.g., by instructing the local language processing component 340 to execute on a previously-determined intent in order to generate a directive). Meanwhile, a "terminate" event may instruct the local language processing component 340 to terminate further execution based on the audio data 211, such as when the device 110 receives directive data from the system 120 and chooses to use that remotely-generated directive data.

Thus, when the audio data 211 is received by the voice services component 322, the HP 326 may allow the audio data 211 to pass through to the system 120 and the HP 326 may also input the audio data 211 to the on-device language processing component 341 by routing the audio data 211 through the HEC 327 of the hybrid selector 324, whereby the LRO 328 notifies the local language processing component 341 of the incoming audio data 211. At this point, the hybrid selector 324 may wait for response data from either or both of the system 120 or the local language processing component 340. However, the disclosure is not limited thereto, and in some examples the hybrid selector 324 may send the audio data 211 only to the local language processing component 341 without departing from the disclosure. For example, the device 110 may process the audio data 211 locally without sending the audio data 211 to the system 120.

The local SLU component 340 is configured to receive the audio data 211 from the hybrid selector 324, to recognize speech in the audio data 211, to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by the local language processing component 340 (and/or the system 120) may be formatted using Java, such as JavaScript syntax, or JavaScript-based syntax. This may include formatting the directive using JSON. In at least some embodiments, a device-generated directive may be serialized, much like how remotely-generated directives may be serialized for transmission in data packets over the network(s) 199. In at least some embodiments, a device-generated directive may be formatted as a programmatic API call with a same logical operation as a remotely-generated directive. In other words, a device-generated directive may mimic a remotely-generated directive by using a same, or a similar, format as the remotely-generated directive.

The language processing component 340 may process the audio data 211 to determine local NLU output data, which may include intent data and/or slot data, so that directives may be determined based on the intent data and/or the slot data. Thus, the language processing component 340 may process the audio data 211 and attempt to make a semantic interpretation of the spoken input represented by the audio data 211 (e.g., determine a meaning associated with the spoken input) and then implement that meaning. For example, the language processing component 340 may interpret the spoken input, in the audio data 211, in order to derive an intent or a desired action or operation from the user 5. This may include deriving pertinent pieces of information from the spoken input that allow the language processing component 340 to identify a second device in the environment, if the user, for example, intends to control a second device (e.g., a light in the user 5's house). The local language processing component 340 may also provide a dialog management function to engage in speech dialogue with the user 5 to determine (e.g., clarify) intents by asking the user 5 for information using synthesized speech prompts.

In at least some embodiments, the language processing component 340 may output a single NLU hypothesis determined to most likely representing the spoken input in the audio data 211. Alternatively, in at least some embodiments, the language processing component 340 may output multiple NLU hypotheses in the form of a lattice or an N-best list, with individual NLU hypotheses corresponding to respective confidence values or other values (such as probability values, etc.). In at least some embodiments, the language processing component 340 may be customized to the user 5 (or multiple users) who created a user account to which the device 110 is registered. For example, the language processing component 340 may process the audio data 211 based on known information (e.g., preferences) of the user 5, and/or on a history of previous interactions with the user 5.

NLU output data, as determined by the device 110 and/or the system 120, may include confidence data representing a confidence and/or estimated accuracy of the NLU output data. Such confidence data may come in the form of a numeric score, but may also come in different forms such as an indicator of Low, Medium, or High, a ranking, or other data. The confidence data may be set to a similar scale so that confidence data for one set of NLU results (e.g., NLU output data generated by the device 110) may be evaluated with regard to confidence data for another set of results (e.g., NLU output data generated by the system 120).

Thus, an NLU hypothesis may be selected as usable to respond to the spoken input, and the local language processing component 340 may send local response data (e.g., local NLU output data and/or local directive data) to the hybrid selector 324, such as a "ReadyToExecute" response, which can indicate that the local language processing component 340 has recognized an intent, or is ready to communicate failure (e.g., if the local language processing component 340 could not recognize an intent). The hybrid selector 324 may then determine whether to use directive data from the local language processing component 340 to respond to the spoken input, to use directive data received from the system 120, assuming a remote response is even received (e.g., when the device 110 is able to access the system 120 over the network(s) 199), or to generate output audio requesting additional information from the user 5.

The device 110 and/or the system 120 may associate a unique identifier with each spoken input. The device 110 may include the unique identifier when sending the audio data 211 to the system 120, and the response data from the system 120 may include the unique identifier to identify which spoken input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. Accordingly, the term "skill" may be used interchangeably with the terms "speechlet," "domain," or "domain implementation." The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill component 125 may be configured in a local environment (e.g., home server and/or the like) such that the device 110 may communicate with the skill component 125 via a private network [such as a local area network (LAN)].

In order to generate a particular interpreted response, the language processing component 340 may apply grammar models and lexical information associated with the respective skill component(s) 390 to recognize one or more entities in the spoken input. In this manner the language processing component 340 may identify "slots" (i.e., particular words in the spoken input) that may be needed for later command processing. Depending on the complexity of the language processing component 340, it may also label each slot with a type of varying levels of specificity (such as noun, place, city, artist name, song name, device name, or the like). Each grammar model used by the language processing component 340 may include the names of entities (i.e., nouns) commonly found in speech about the particular skill component 390 (i.e., generic terms), whereas the lexical information (e.g., from a gazetteer) is personalized to the user 5 and/or the device 110. For example, a grammar model associated with a navigation skill component may include a database of words commonly used when people discuss navigation.

Accordingly, the intents identified by the language processing component 340 may be linked to skill component-specific grammar frameworks with "slots" or "fields" to be filled (e.g., resolved). Each slot/field corresponds to a portion of the spoken input that the language processing component 340 believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the language processing component 340 may parse the spoken input to identify words as subject, object, verb, preposition, etc., based on grammar rules and/or models, prior to recognizing named entities. The identified verb may be used by the language processing component 340 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The language processing component 340 may then search the corresponding fields in the skill component-specific and personalized lexicon(s), attempting to match words and phrases in the spoken input tagged as a grammatical object or object modifier with those identified in the database(s).

Various machine learning techniques may be used to train and operate models to perform various processes described herein, such as identifying sensitive data, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 4:
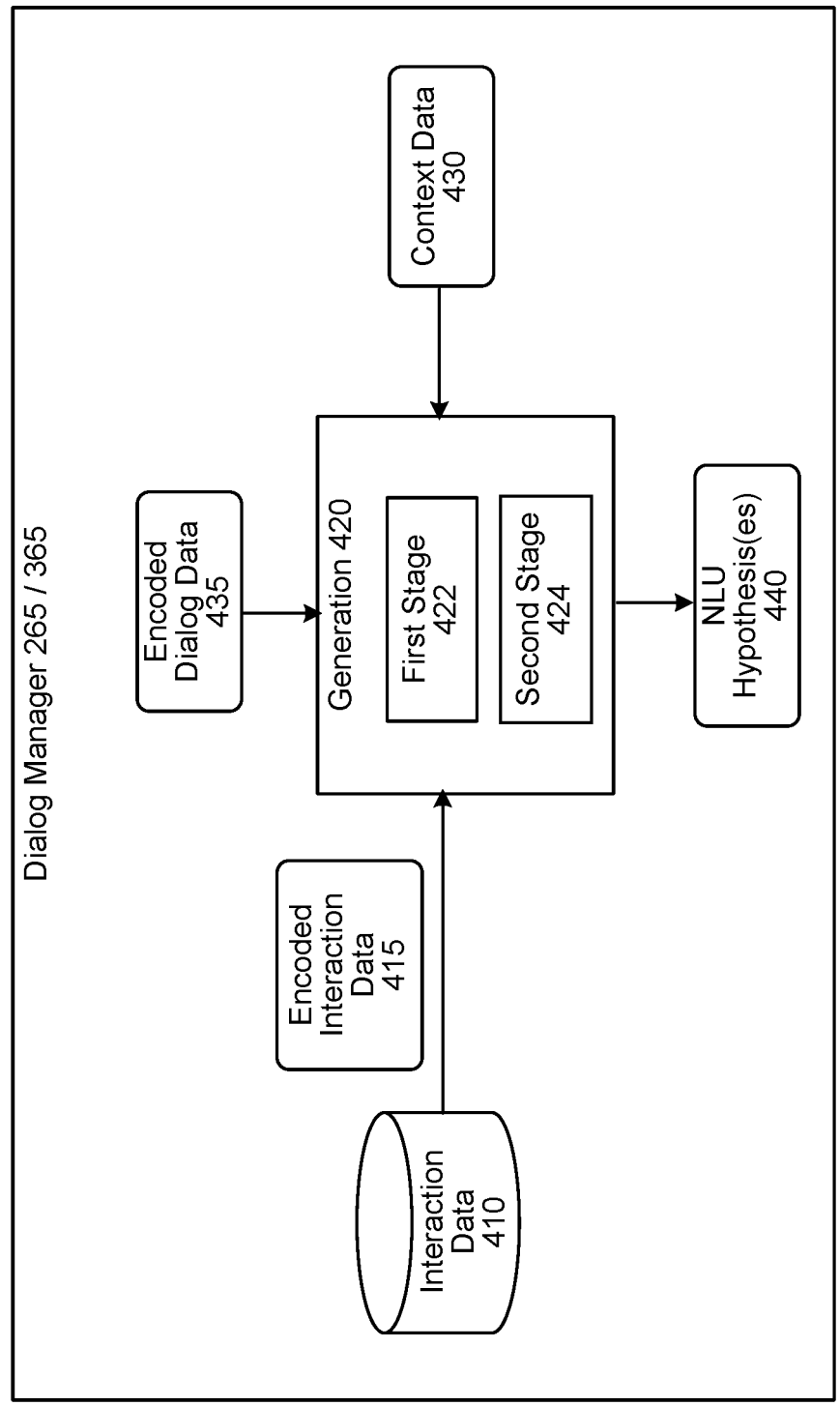
FIG. 4 is a conceptual diagram illustrating how a dialog manager may process data to predict one or more NLU hypotheses for the next turn of the dialog, according to embodiments of the present disclosure.

FIG. 4 is a conceptual diagram illustrating how the dialog manager 265/365 processes data to predict one or more NLU hypotheses for the next turn of the dialog, according to embodiments of the present disclosure. The dialog manager 265/365, in some embodiments, may include a generation component 420 that includes a first stage component 422 and a second stage component 424.

The generation component 420 is configured to process the structured interaction data (e.g., stored at 410), dialog data (e.g., encoded dialog data 435), and context data (e.g., 430) to predict a dialog goal or user's interest (in the form of a NLU hypothesis) during the dialog session. The first stage component 422 may be considered a pre-filter component that determines top K candidates from the interaction data based on the dialog data. The second stage component 424 may be considered a ranking or generation component that makes a final determination, using the top K candidates, as to one or more NLU hypotheses corresponding to a predict user input for a subsequent turn. The first stage component 422 and the second stage component 424 may be trained together using training data representing historical dialog sessions that include past user inputs and past system responses to the past user inputs within a dialog session. Thus, the training data may indicate a progression of historic dialogs, enabling the generation component 420 to predict the dialog goal in the instant dialog session.

The dialog manager 265/365 may include (or otherwise access) interaction data storage 410 storing interaction data corresponding to historic interactions between users and the system 120. The interaction data storage 410 may store indexed data that is organized by NLU hypotheses. For example, the interaction data storage 410 may include a first document corresponding to a first NLU hypothesis (e.g., domain, intent, slot values). The interaction data storage 410 may store one or more past user inputs received by the system 120, the number of times each of the past user inputs was received by the system 120, and the number of times the past user input caused a defect. The interaction data storage 410 may also store a sample input for a NLU hypothesis. A sample input may be provided by a system/application/skill developer and may represent an input that resolves to the particular NLU hypothesis and causes the system 120 to output a desired response. The interaction data storage 410 may also include one or more system-generated responses for each NLU hypothesis, the number of times each of the system-generated responses was outputted, and the number of times each of the system-generated responses was a defect (i.e. undesired response).

Figure 5:
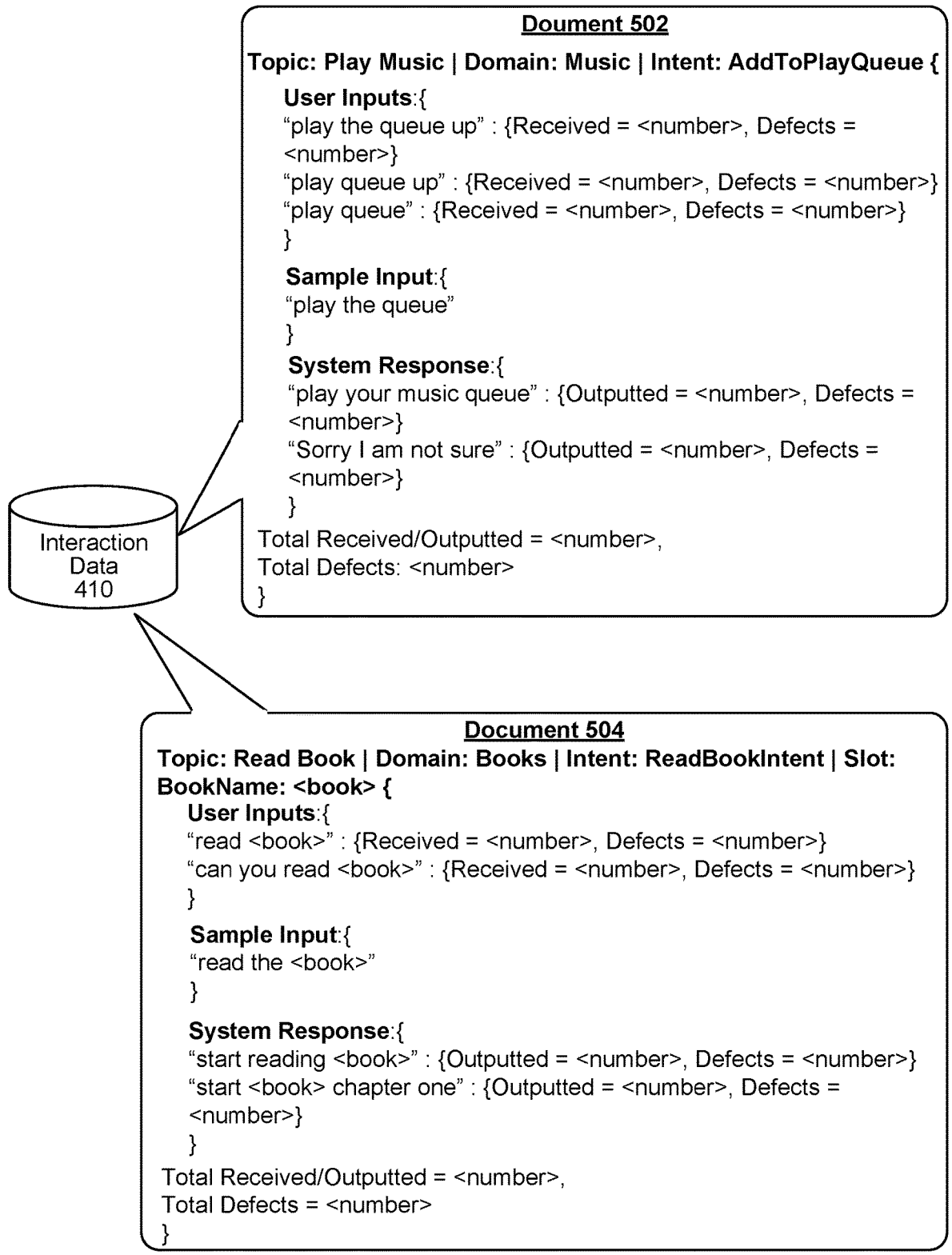
FIG. 5 is a conceptual diagram illustrating example interaction data used by the dialog manager, according to embodiments of the present disclosure.

FIG. 5 is a conceptual diagram illustrating example interaction data stored at the interaction data storage 410, according to embodiments of the present disclosure. The interaction data storage 410 may store a structured representation of historic user inputs provided to the system 120 along with some metrics, sample inputs from developers, and historic system-generated responses along with some metrics. A structured representation may be referred to as a document that corresponds to a particular NLU hypothesis and dialog topic. The interaction data storage 410 may store multiple documents, each corresponding to a different NLU hypothesis and dialog topic.

For example, shown in FIG. 5 is document 502 which may be included in a first document corresponding to a first dialog topic and first NLU hypothesis, in this case, [topic: play music domain: music intent: AddToPlayQueue]. The document 502 includes user inputs received by the system 120 that correspond to the first NLU hypothesis, along with the number of times each user input was received and the number of times each user input resulted in a defect. For example, a first user input "play the queue up" may be received <number> (e.g., 79) times, and resulted in a defect <number> (e.g., 10) times. The document 502 also includes a sample input "play the queue" that may be provided by a developer as an input that corresponds to the first NLU hypothesis. The document 502 also includes system responses that were outputted by the system 120 when a user input corresponding to the first NLU hypothesis was received by the system 120, along with the number of times the response was outputted and the number of times the response was a defect. For example, a first system response "play your music queue" may be outputted <number> (e.g., 225) times and was a defect (undesired response) <number> (e.g., 25) times. The document 502 may also include overall metrics representing the total number of times user inputs corresponding to the first NLU hypothesis were received/ outputted by the system 120, and the total number of times a user input corresponding to the first NLU hypothesis resulted in a defect. For example, as shown, a total of <number> (e.g., 225) user inputs for the first NLU hypothesis were received and responded to, and a total of <number> (e.g., 25) defects were caused.

Document 504 at the interaction data storage 410, may correspond to a second dialog topic and a second NLU hypothesis, for example, [topic: read book domain: books intent: ReadBookIntent|slot type: BookName|slot value: <book>]. Similar to the first document, the second document may include user inputs corresponding to the second NLU hypothesis, along with the number of times each user input was received and the number of times each user input resulted in a defect, a sample input corresponding to the second NLU hypothesis, and system responses to user inputs corresponding to the second NLU hypothesis, along with the number of times each response was outputted and the number of times each response was a defect. For example, as shown, document 504 may include a first user input "read <book>" that was received <number> (e.g., 21) times, and resulted in a defect <number> (e.g., 10) times. The document 504 may include a sample input "read the <book>" and a first system response "start reading <book>" that was outputted <number> (e.g., 24) times and was a defect <number> (e.g., 10) times. The total number of times user inputs for the second NLU hypothesis was received by the system and responded to is <number> (e.g., 26), and the total number of defects caused is <number> (e.g., 10).

Thus, the interaction data storage 410 includes (at least) three data types. Using the user inputs in the data storage 410, the dialog manager 265/365 may predict the user's latent interest/goal of the dialog by aligning the dialog data (representing the previous turns of the dialog) with historical interaction data, while considering a defects rate. Using the sample inputs in the data storage 410, the system may align the dialog data with one or more expected/sample inputs that correspond to a specific NLU hypothesis. Using the system responses in the data storage 410, the system may align the dialog data with historic system responses, while considering a defects rate. In some embodiments, the dialog manager 265/365 uses deep learning models to achieve the alignment between stored interaction data 410 and the dialog data of the instant dialog session.

Referring to FIG. 4, encoded interaction data 415 may be provided to the generation component 420 for processing. The dialog manager 265/365 (or another component) may determine the encoded interaction data 415 (as described in relation to FIG. 6, which illustrates how the encoded interaction data 415 is determined, according to embodiments of the present disclosure). The encoded interaction data 415 may be determined prior to the system 120 receiving a user input for the instant dialog session. For example, the interaction data storage 410 may be updated on a periodic basis using user inputs received by the system 120 over a period of time. After the interaction data storage 410 is updated, the dialog manager 265/365 or another component may determine the encoded interaction data 415 as described below, and the interaction data storage 410 may store the encoded interaction data 415 for later use (for example, as part of the first stage of processing). In other embodiments, the encoded interaction data 415 may be determined after a (first) user input for the instant dialog session is received. In some embodiments, the dialog manager 265/365 may use the same encoded interaction data 415 for processing, as the dialog progresses and additional dialog turns take place.

Figure 6:
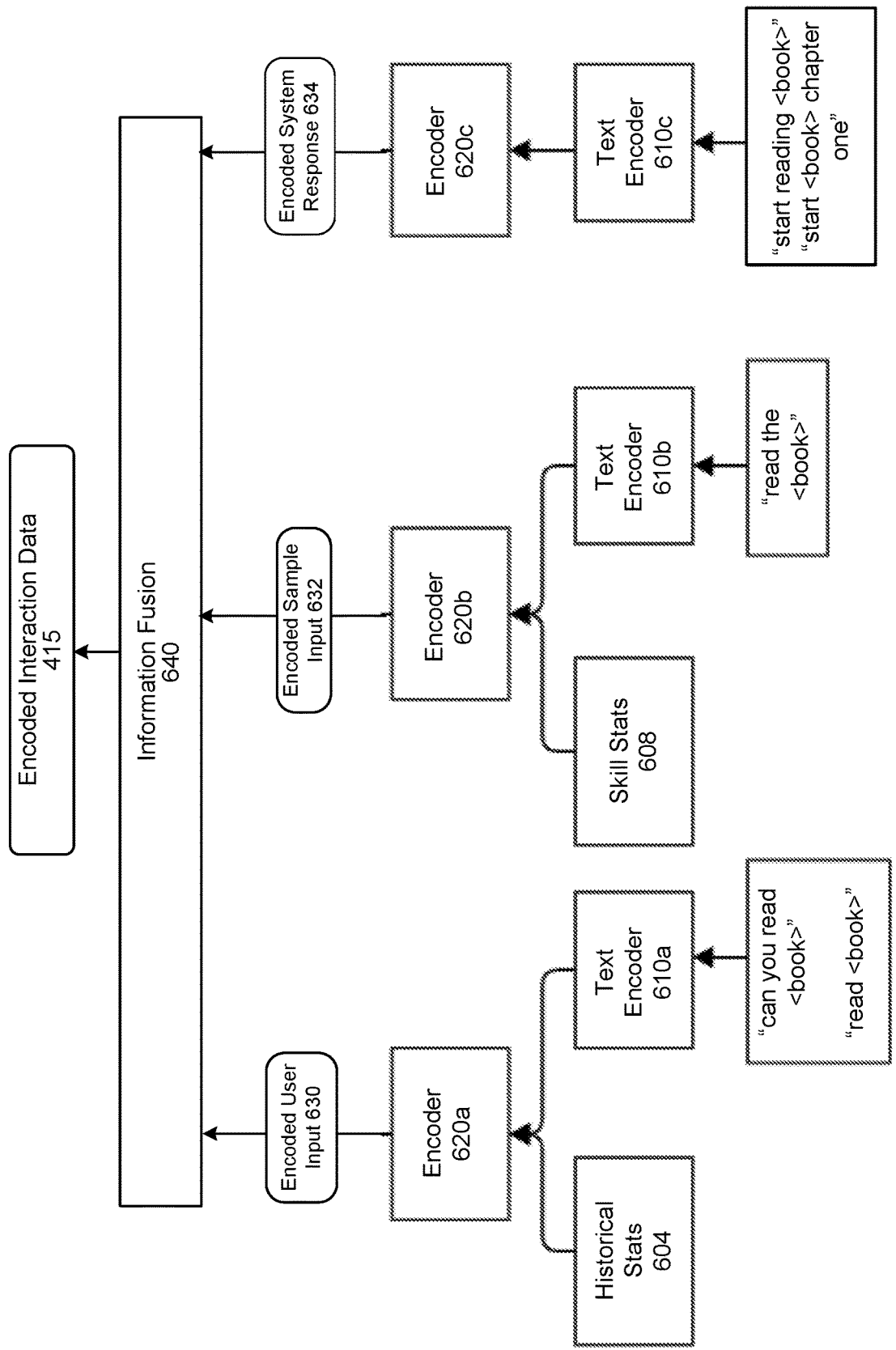
FIG. 6 is a conceptual diagram illustrating how encoded interaction data may be determined, according to embodiments of the present disclosure.

The dialog manager 265/365 may determine the encoded interaction data 415 using an early fusion technique or a late fusion technique. FIG. 6 illustrates an example late fusion technique, where the 3 data types (user inputs, sample input, and system responses) of the interaction data are processed using separate encoders (620a, 620b, 620c), and the results are fused together to generate the encoded interaction data 415.

Referring to FIG. 6, text data, representing the user inputs of the second document represented by document 504, may be processed using a text encoder 610a. The text encoder 610a may be configured to generate word embeddings corresponding to the words in the user inputs. The dialog manager 265/365 may process historical stats data 604 and the output of the text encoder 610a using an encoder 620a. The historical stats data 604 may correspond to the user inputs, and may represent the number of times each of the user inputs was received and the number of times each user input resulted in a defect. The encoder 620a may be an embedding average model or a hierarchical attention model. The encoder 620a may be configured to combine the historical stats data 604 and the output of the text encoder 610a to generate encoded user input data 630.

Text data, representing the sample input of the second document represented by the document 504, may be processed using a text encoder 610b. The text encoder 610b may be configured to generate word embeddings corresponding to the words in the sample input. The dialog manager 265/365 may process skill stats data 608 and the output of the text encoder 610b using an encoder 620b. The skill stats data 608 may correspond to the skill that provided the sample input as being an input that the skill can successfully process for the corresponding NLU hypothesis. The skill stats data 608 may represent the number of times the skill was invoked/used by the system 120 to respond to user inputs for the corresponding NLU hypothesis. The skill stats data 608 may represent a number of users that have enabled the skill or subscribed to the skill. The skill stats data 608 may represent a rating (e.g., a satisfaction rating) indicating different users' satisfaction/feedback with respect to the skill. The encoder 620b may be an embedding average model or a hierarchical attention model. The encoder 620b may be configured to combine the skill stats data 608 and the output of the text encoder 610b to generate encoded sample input data 632.

Text data, representing the system responses of the second document represented by the document 504, may be processed by a text encoder 610c. The text encoder 610c may be configured to generate word embeddings corresponding to the words in the system responses. The dialog manager 265/365 may process the output of the text encoder 610c using an encoder 620c to generate encoded system response data 634. The encoder 620c may be an embedding average model or a hierarchical attention model.

An information fusion component 640 may process the encoded user input data 630, the encoded sample input data 632 and the encoded system response data 634. The information fusion component 620 may aggregate the various data 630, 632, and 634 to generate the encoded interaction data 415. The information fusion component 620 may be a machine learning model (e.g., a neural network) configured to combine the data 630, 632 and 634.

The encoded interaction data 415 may correspond to a particular NLU hypothesis of the document being processed. The dialog manager 265/365 may determine multiple different instances of the encoded interaction data 615, each corresponding to a different NLU hypothesis. For example, first encoded interaction data 615a may correspond to a first NLU hypothesis represented by the document 502, second encoded interaction data 615b may correspond to a second NLU hypothesis represented by the document 504, and so on. The dialog manager 265/365 may determine encoded interaction data for each document/NLU hypothesis represented in the interaction data storage 410.

Referring to FIG. 4, encoded dialog data 435 may be provided to the generation component 420 for processing. The dialog manager 265/365 (or another component) may determine the encoded dialog data 435 as described in relation to FIG. 7 or FIG. 8. Dialog data, used to determine the encoded dialog data 435, may include data representing user inputs and system-generated responses for the instant dialog between the user 5 and the system 120. The dialog data may represent data for one or more turns of the dialog that have taken place so far.

The dialog data may include tuple data corresponding to each word in a user input or a system-generated response, where the tuple data may include: (1) token data (determined by the ASR component 250 representing a word); (2) a turn tag (identifying a turn of the dialog); (3) an identity tag (identifying whether the word corresponds to a user input or a system-generated response); and (4) token position (identifying the position of the word within the user input or the system-generated response). In some embodiments, the token data may be a word embedding corresponding to a word of the user input or the system-generated response.

For example, in the first turn if a user says "what time is it" and the system response is "it's nine am", the dialog data representation may be [("what", t1, user, pos_0), ("time", t1, user, pos_1), ("is", t1, user, pos_2), ("it", t1, user, pos_3), ("it's", t1, system, pos_0), ("nine", t1, system, pos_1), ("am", t1, system, pos_2)]. In some embodiments, the dialog data may also include the NLU hypothesis (e.g., intent and/or slot type) corresponding to the user input associated with a turn tag. For example, for the user input "what time is it," the NLU hypothesis included in the dialog data may be [t1, intent:WhatTimeIntent|slot type:time|slot value: now].

Figure 7:
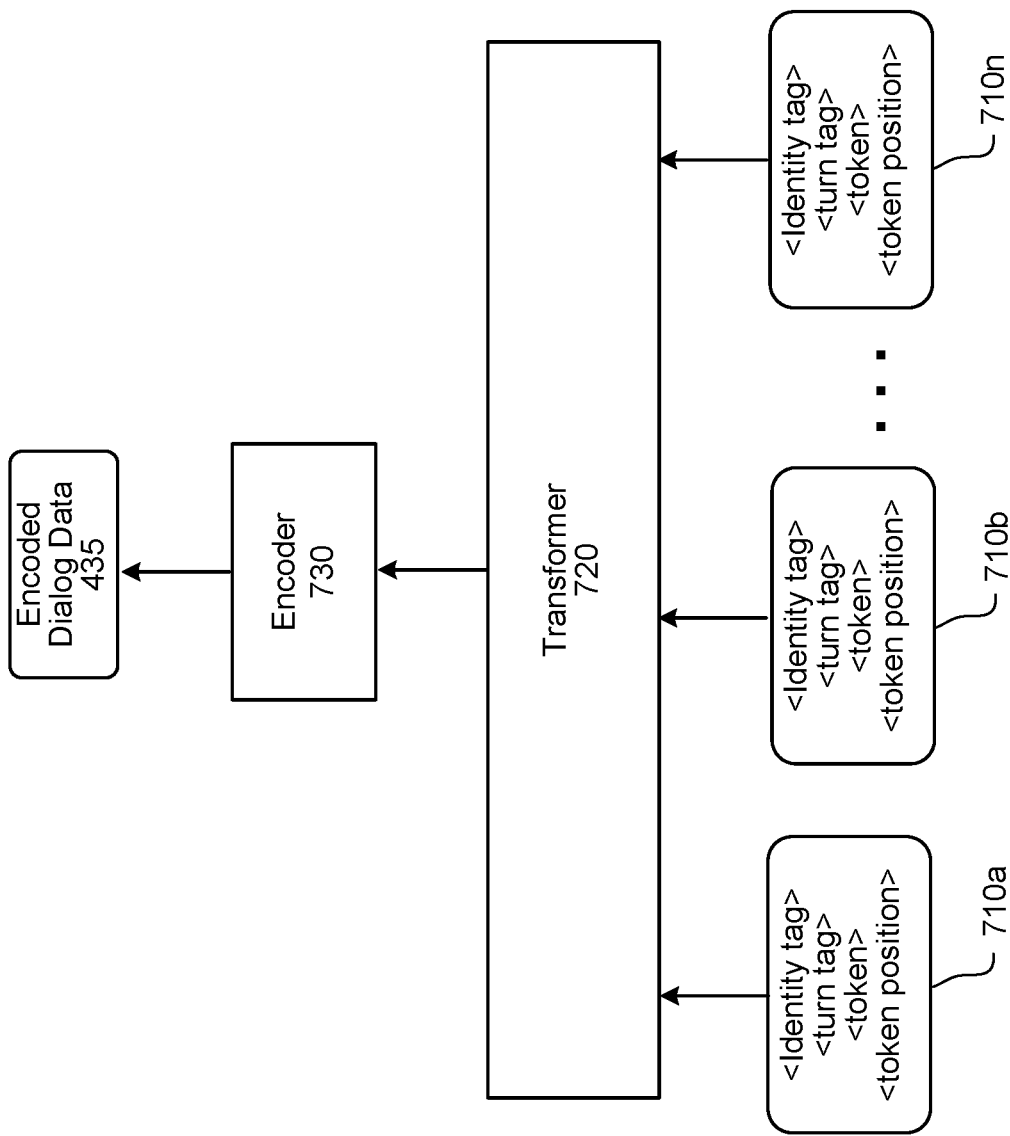
FIG. 7 is a conceptual diagram illustrating how encoded dialog data may be determined, according to embodiments of the present disclosure.

FIG. 7 is a conceptual diagram illustrating how encoded dialog data 435 is determined, according to embodiments of the present disclosure. Data 710 corresponds to particular words within the dialog data, and includes the tuple data described above. The order in which information is represented in the tuple data can vary. The data 710a may correspond to a first word of a user input during a first turn of the dialog, the data 710b may correspond to a second word of the user input, and the data 710n may correspond to the last word of the system-generated response during the Nth turn of the dialog that has taken place so far. An example dialog is as follows:

User (turn 1): "What is the time?"
System (turn 1): "It is nine am."
User (turn 2): "Ok, can you book me a taxi to work for pickup at 9:30 am?"
System (turn 2): "Ok. Here is the reservation number for the taxi, <number>."

In the foregoing example, the data 710a may be {user, turn_1, "what", pos_0} and the data 710n may be {system, turn_2, "<number>", pos_9}. A transformer layer 720 may process the data 710. The transformer layer 720 may be a machine learning model, such as a neural network. A hidden representation of the data 710 is obtained from the transformer layer 720 and processed using an encoder 730 to generate the encoded dialog data 435. The encoder 730 may employ an averaging technique, a CNN and pooling layers, or an attention model to aggregate/combine the data 710 corresponding to each word in the dialog data.

Figure 8:
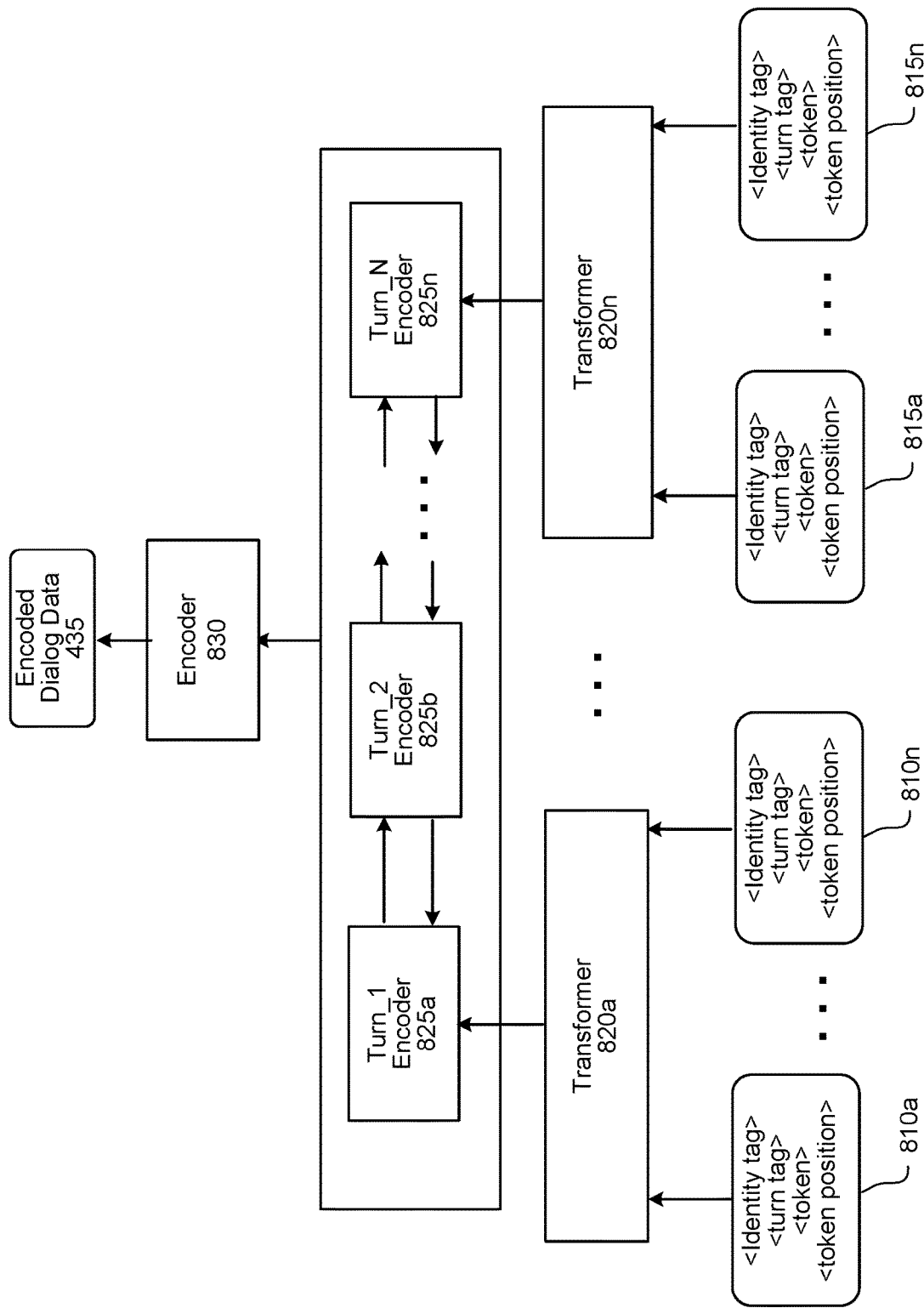
FIG. 8 is a conceptual diagram illustrating how encoded dialog data may be determined, according to other embodiments of the present disclosure

FIG. 8 is a conceptual diagram illustrating how encoded dialog data 435 is determined, according to other embodiments of the present disclosure. In this example, a hierarchical based technique may be used for encoding the dialog data. Data 810 corresponds to particular words of the first turn of the dialog, and data 815 corresponds to particular words of the Nth turn of the dialog that has taken place so far. The data 810a may correspond to a first word in a user input of the first turn of the dialog and the data 810n may correspond to the last word in a system-generated response of the first turn of the dialog. The data 815a may correspond to a first word in a user input of the last turn of the dialog, and the data 815n may correspond to the last word in a system-generated response of the last turn of the dialog. The data 810 and 815 may include the tuple data described above. Continuing with the foregoing example, the data 810a may be {user, turn_1, "what", pos_0}, the data 810n may be {system, turn_1, "am", pos_3}, the data 815a may be {user, turn_2, "ok", pos_0} and the data 815n may be {system, turn 2, "<number>", pos_9}.

Referring to the embodiment of FIG. 8, dialog data for each turn may be processed using separate transformer layers 820. For example, the data 810 corresponding to the first turn of the dialog may be processed using the transformer layer 820a, and the data 815 corresponding to the Nth turn of the dialog may be processed using the transformer layer 820n. The hidden representations obtained from the transformer layers 820 may be processed by separate encoders 825 for each turn of the dialog. For example, the hidden representation from the transformer layer 820a may be processed by a turn 1 encoder 825a, the hidden representation from a transformer layer 820b (not shown) may be processed by the a turn_2 encoder 825b, and the hidden representation from the transformer layer 820n may be processed by a turn N encoder 825n. Each encoder 825 may employ averaging techniques, CNN and pooling techniques or an attention model. The encoders 825 may be LSTMs and may share parameters and data with each other for context. An encoder 830 may aggregate or combine the outputs of the encoders 825 to generate the encoded dialog data 435.

The dialog manager 265/365 may determine the encoded dialog data 435 at the end of each turn of the instant dialog. The end of a turn may be indicated when the system-generated response is determined or is presented to the user 5. For example, the dialog manager 265/365 may determine first encoded dialog data 435 after the system-generated response for the first turn is determined/presented. Using the first encoded dialog data 435, the generation component 420 may predict the NLU hypothesis(es) 440 for the next (second) turn of the instant dialog. After a system-generated response is determined/presented for the second turn, the dialog manager 265/365 may determine second encoded dialog data 435, which may be used by the generation component 420 to predict the NLU hypothesis(es) 440 for the next (third) turn of the instant dialog, and so on.

Referring to FIG. 4, context data 430 may also be provided to the generation component 420 for processing. The context data 430 may include data representing device information for the device 110, from which the user input is received. The device information may include a device identifier, a device type, device capabilities (e.g., type of output the device 110 is capable of presenting), device profile information (e.g., whether the device 110 is configured for a child user), content output status (e.g., indicating whether the device 110 is presently outputting content, such as music, video, etc.), etc.

The context data 430 may additionally or alternatively include data corresponding to the user 5 that provided the user input and is engaged in the dialog with the system 120. The data corresponding to the user 5 may include data from profile storage 270, a user identifier, background information, user demographics, user preferences (e.g., a preference for one skill over another, music preferences, restaurant/food preferences, sporting team preferences, etc.), applications/skills enabled for the user 5/device 110, services the user 5 is subscribed to, etc.

The context data 430 may additionally or alternatively include location information for the location of the device 110 and/or the location of the user 5. The location information may be a geographic location (e.g., an address, GPS coordinates, etc.), and/or a user-defined location, such as, work, home, vacation home, car, school, etc.

The context data 430 may additionally or alternatively include time information corresponding to when the user 5 started the instant dialog with the system 120, the (current) time when the user input of the previous turn was received, the time when the user inputs of each turn of the dialog were received, etc. The time information may also represent the day (e.g., Monday), the week (e.g., $30^{th}$ week), the month (e.g., April), the year, the season (e.g., Fall), etc. for when the user 5 started the instant dialog.

The generation component 420 may be configured to process the encoded interaction data 415, the encoded dialog data 435 and the context data 430 to determine one or more NLU hypotheses 440 corresponding to a subsequent turn (or some other future turn) of the dialog. The NLU hypothesis(es) 440 may be provided to downstream components, for example, by the orchestrator 230/LRO 328. The downstream components may determine whether or not to use a NLU hypothesis from the NLU hypothesis(es) 440 to generate output data to present to the user 5 during the dialog. The downstream components may include one or more skill components 290/390 or skill system 125, which may determine to use a NLU hypothesis 440 to determine output data corresponding to what the user 5 may be interested in based on the dialog taken place so far. The NLU hypothesis(es) 440 may include one or more intents corresponding to the subsequent turn. The NLU hypothesis(es) 440 may include one or more entities corresponding to the subsequent turn. The NLU hypothesis(es) 440 may include one or more dialog topics corresponding to the dialog session or the subsequent turn. The intents, entities, and/or dialog topics (of data 440) may be used by a downstream component configured to generate proactive outputs (that are not in response to a specific user input) to generate an output representing information that may be of interest to the user 5. The output, in some embodiments, may ask the user 5 whether the user would like to receive additional (unsolicited) information/content related to the dialog session, and if the user responds affirmatively, then the system may generate an output using a hypothesis 440.

Figure 9:
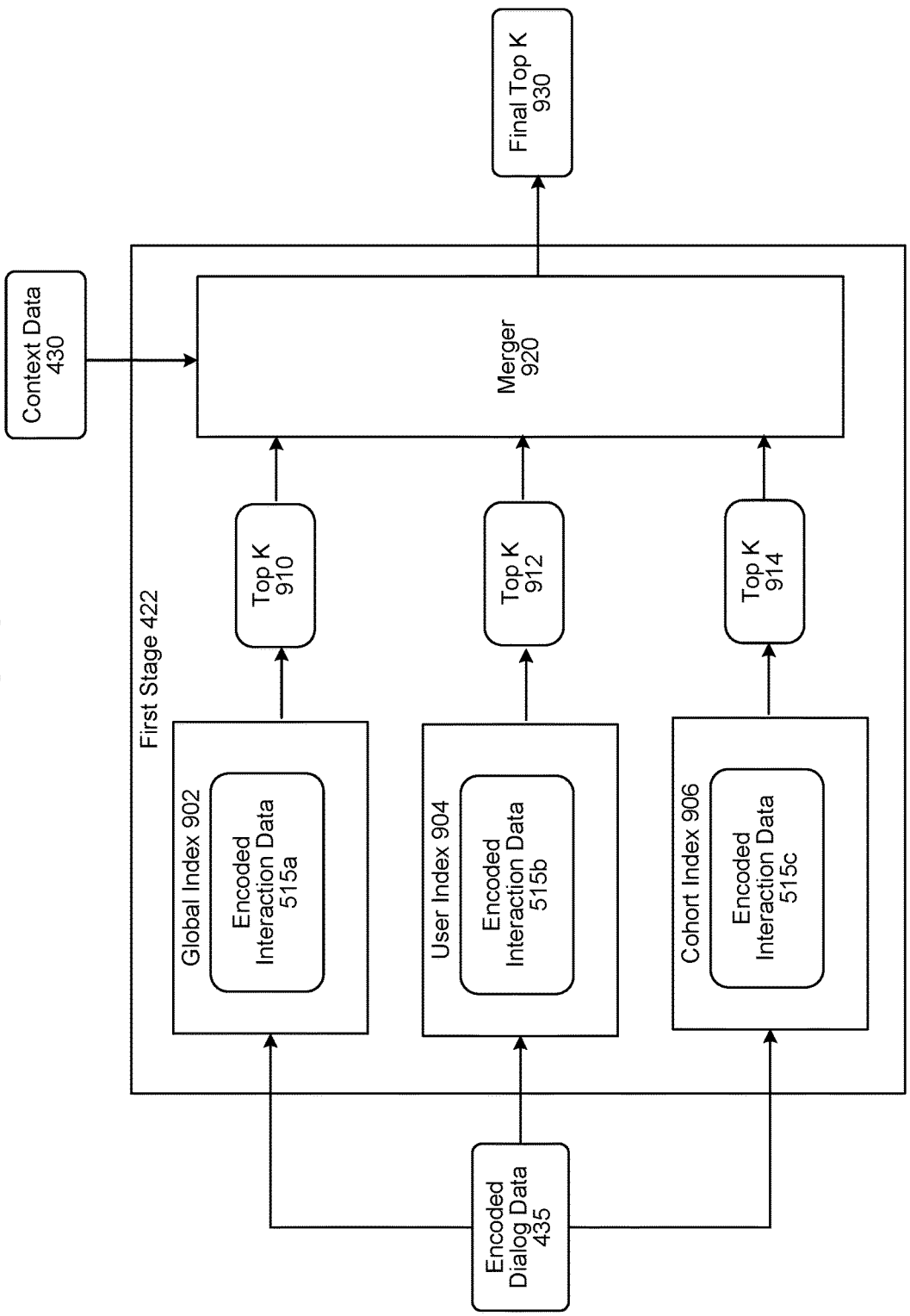
FIG. 9 is a conceptual diagram illustrating a first stage of processing to predict one or more NLU hypotheses for the next turn of the dialog, according to embodiments of the present disclosure.

FIG. 9 is a conceptual diagram illustrating a first stage of processing, performed by the first stage component 422 (of the generation component 420), to predict one or more NLU hypotheses for the next turn of the dialog, according to embodiments of the present disclosure. The first stage component 422 may process different types/levels of interaction data, including (1) global level interaction data representing interactions between multiple different users and the system 120, (2) user level interaction data representing interactions between the user 5 and the system 120, and (3) cohort level interaction data representing interactions between a group of users that the user 5 belongs to.

In some embodiments, the interaction data storage 410 may store interaction data relating to the different levels. For example, the interaction data storage 410 may store first interaction data corresponding to the global level, second interaction data corresponding to the user level, and third interaction data corresponding to the cohort level. In other embodiments, there may be separate instances of the interaction data storage 410 storing interaction data corresponding to the different levels. For example, a first interaction data storage 410a may store interaction data corresponding to the global level, a second interaction data storage 410b may store interaction data corresponding to the user level, and a third interaction data storage 410c may store interaction data corresponding to the cohort level.

The first stage component 422 may include separate components to process the different levels of interaction data in view of the encoded dialog data 435. A global index component 902 may process the encoded dialog data 435 and the encoded interaction data 515a corresponding to the global level to determine top K data 910 representing one or more NLU hypotheses. The global index component 902 may perform k Nearest Neighbor (kNN) processing to determine one or more NLU hypotheses, from the encoded interaction data 515a, that are semantically similar to the encoded dialog data 435. The global index component 902 may be configured to minimize the cosine distance between the interaction data 515a and the encoded dialog data 435.

A user index component 904 may process the encoded dialog data 435 and the encoded interaction data 515b corresponding to the user level to determine top K data 912 representing one or more NLU hypotheses. The user index component 904 may perform kNN processing to determine one or more NLU hypotheses, from the encoded interaction data 515b, that are semantically similar to the encoded dialog data 435. The user index component 904 may be configured to minimize the cosine distance between the interaction data 515b and the encoded dialog data 435.

A cohort index component 906 may process the encoded dialog data 435 and the encoded interaction data 515c corresponding to the cohort level to determine top K data 914 representing one or more NLU hypotheses. The cohort index component 906 may perform kNN processing to determine one or more NLU hypotheses, from the encoded interaction data 515c, that are semantically similar to the encoded dialog data 435. The cohort index component 906 may be configured to minimize the cosine distance between the interaction data 515c and the encoded dialog data 435.

The top K data 910, 912 and 914 may include, in some embodiments, a different number of NLU hypotheses, and may not include the same number of NLU hypothesis. As such 'K' may be a different number/value for each of top K data 910, 912 and 914. A merger component 920 may process the top K data 910, 912 and 914 to determine final top K data 930. The merger component 920 may perform merging, pruning, ranking and/or other combining techniques using the top K data 910, 912 and 914. The merger component 920, in some embodiments, may also use the context data 430 to determine the final top K data 930. Thus, the final top K data 930 includes NLU hypotheses that are determined based on different levels of interaction data. The final top K data 930 may represent a list of NLU hypotheses corresponding to the user input for the next turn in the dialog.

Figure 10:
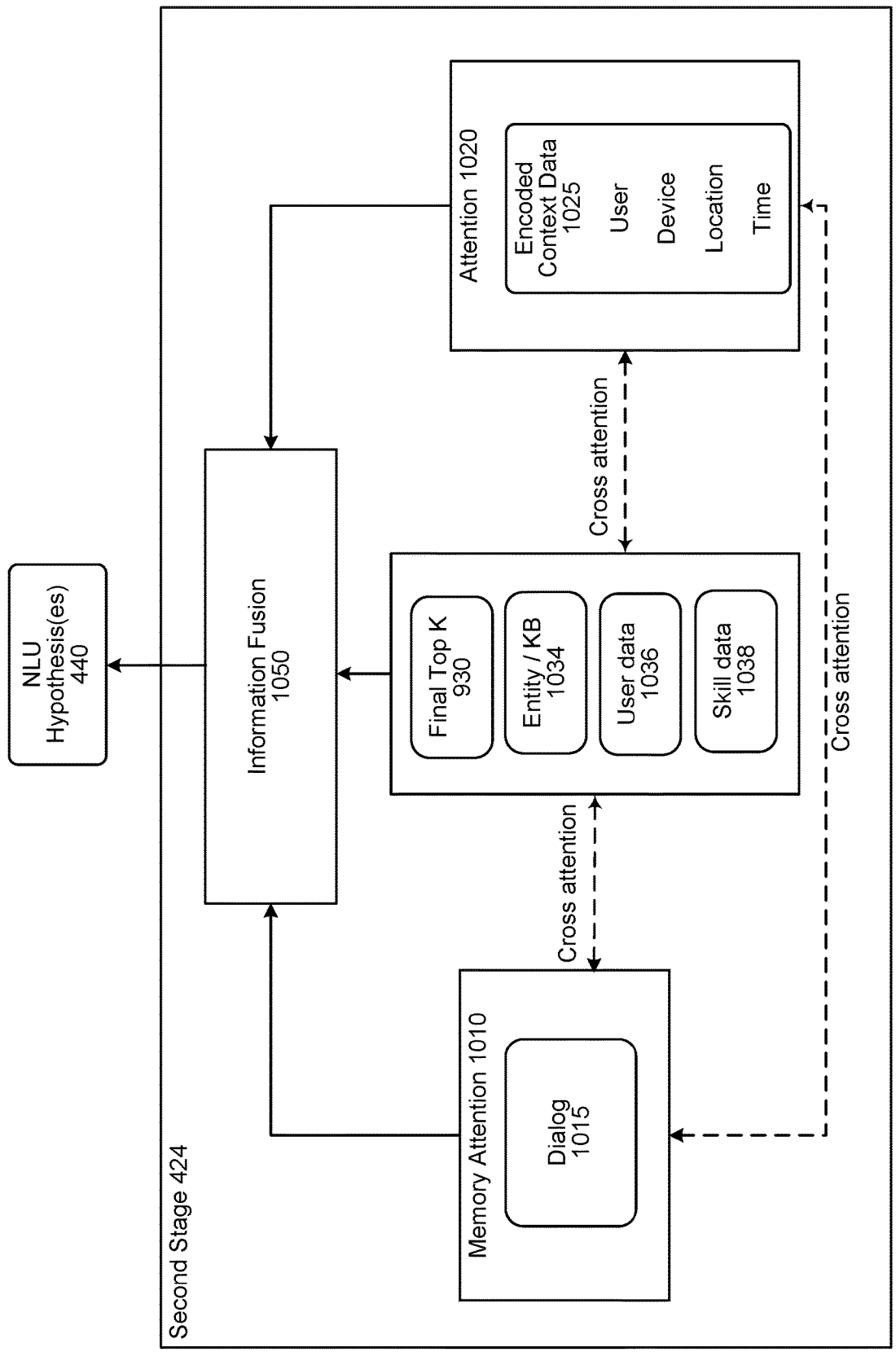
FIG. 10 is a conceptual diagram illustrating a second stage of processing to predict one or more NLU hypotheses for the next turn of the dialog, according to embodiments of the present disclosure.

FIG. 10 is a conceptual diagram illustrating a second stage of processing, performed by the second stage component 424 (of the generation component 420), to predict one or more NLU hypotheses 440 for the next turn of the dialog, according to embodiments of the present disclosure. The second stage component 424 may process the final top K data 930 from the first stage component 422, along with dialog data 1015, encoded context data 1025 and other data. The second stage component 424, in this embodiment, may employ a ranking technique to rank the NLU hypotheses in the top K data 930 to determine the NLU hypothesis(es) 440.

To achieve this, the second stage component 424 may process the dialog data 1015 using a memory attention component 1010 that is configured to apply memory attention to the dialog data 1015. The dialog data 1015, which may be referred to as dialog memory, may be generated using multi-hop attention between the final top K data 930 from the first stage component 422, the entity/KB data 1034, and the encoded context data 1025.

The second stage component 424 may determine encoded context data 1025 by processing the context data 430 using an encoder. The encoded context data 1025 may include separate vectors/features corresponding to the various information included in the context data 1025. For example, a first vector may correspond to the user information included in the context data 430, a second vector may correspond to the device information included in the context data 430, a third vector may correspond to the location information included in the context data 430 and a fourth vector may correspond to the time information included in the context data 10K30. An attention component 1020 may process the encoded context data 1025 while applying an attention mechanism to focus on particular portions of the context data 430.

The second stage component 424, in addition to the final top K data 930, may also use entity/KB data 1034 representing entity information and knowledge base information related to the dialog. For example, if the dialog relates to booking a flight to a particular location, then the entity/KB data 1034 may include information on events at the particular location, weather information for the particular location, landmarks/attractions for the particular location, etc. The second stage component 424 may also use user data 1036 representing user preferences, enabled skills/applications, subscribed services, user profile information, etc. The second stage component 424 may also use skill data 1038 representing information corresponding to the skill(s) that was invoked during the instant dialog. The skill data 1038 may include information on the capabilities of the skill(s) (e.g., which intents the skill(s) is able to process), skill rating, the number of times the skill(s) was invoked, skill schema data, etc.

The second stage component 424, in this embodiment, may perform cross attention between the dialog data 1015, the encoded context data 1025, the final top K data 930, the entity/KB data 1034, the user data 1036 and the skill data 1038. The second stage component 424 may perform self-attention between the final top K data 930, the entity/KB data 1034, user data 1036 and the skill data 1038. An information fusion component 1050 may aggregate/combine various information derived from the dialog data 1015, the final top K data 930, the entity/KB data 1034, the user data 1036, the skill data 1038, and the encoded context data 1025, based on the various attention associated with various portions of the information. The information fusion component 1050 may output the NLU hypothesis(es) 440 representing one or more NLU hypotheses for the user input in the next turn of the dialog. The information fusion component 1050 may be a neural network or other type of machine learning model configured to combine the various foregoing data.

Thus, the second stage component 424 uses self-attention and cross-attention mechanisms to discover important factors that help to predict relevant NLU hypotheses for the next dialog turn. The various encoded data are fed into the information fusion component 1050 to make a final decision with respect to a ranking of the NLU hypothesis candidates determined by the first stage component 422. Training of the second stage component 424 may be focused on precision by adopting a margin ranking score at dialog turn level.

Figure 11:
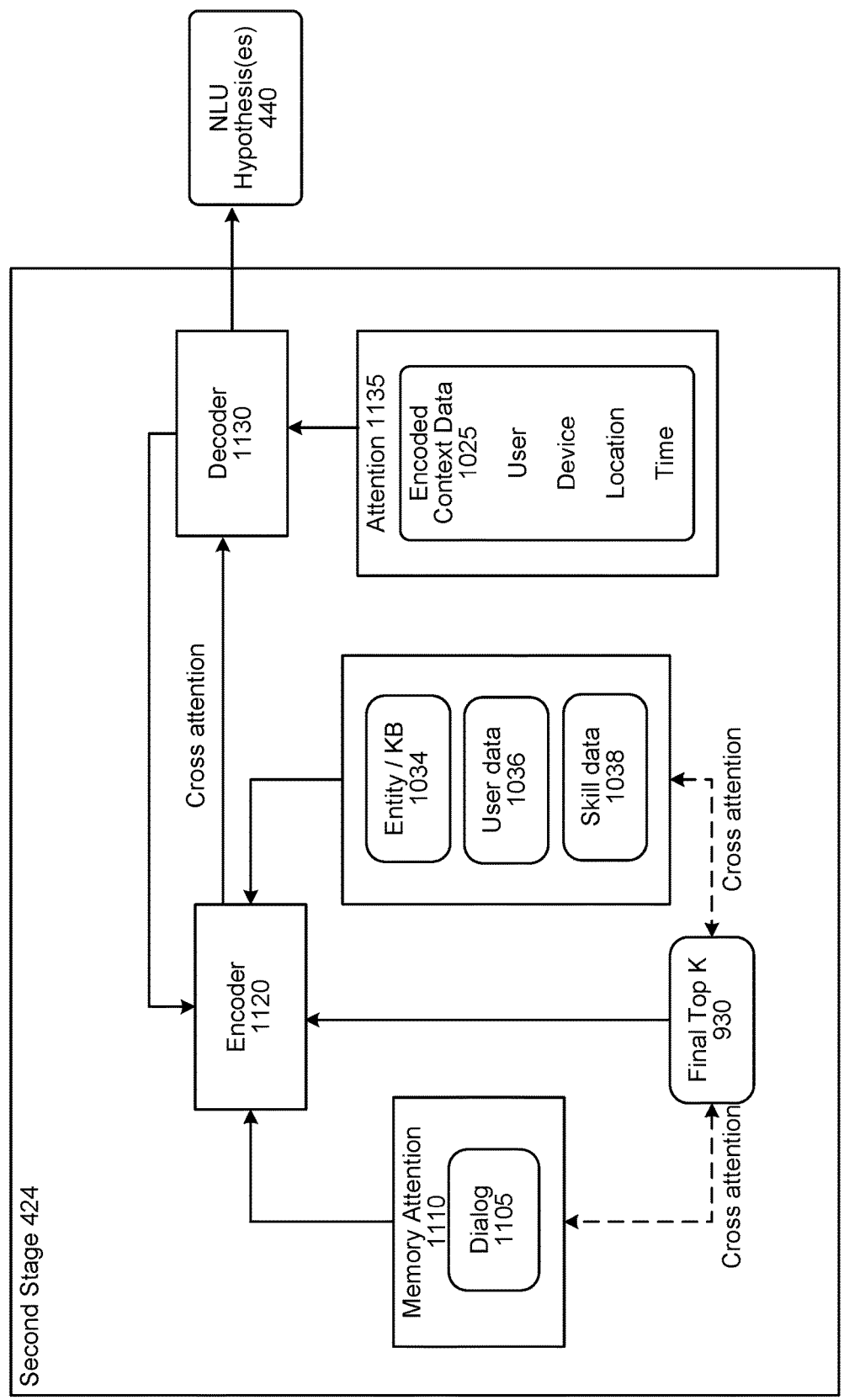
FIG. 11 is a conceptual diagram illustrating a second stage of processing to predict one or more NLU hypotheses for the next turn of the dialog, according to other embodiments of the present disclosure.

FIG. 11 is a conceptual diagram illustrating a second stage of processing, performed by the second stage component 424, to predict one or more NLU hypotheses for the next turn of the dialog, according to other embodiments of the present disclosure. The second stage component 424 may process the final top K data 930 from the first stage component 422, along with dialog data 1105, encoded context data 1025 and other data. The second stage component 424, in this embodiment, may employ a generation technique to generate one or more NLU hypothesis(es) 440 based on processing of the foregoing data.

To achieve this, the second stage component 424 may process the dialog data 1105 using a memory attention component 1110 that is configured to apply memory attention to the dialog data 1105. The dialog data 1105, which may be referred to as dialog memory, may be generated using multi-hop attention between the final top K data 930 from the first stage component 422 and the entity/KB data 1034.

The second stage component 424, in this embodiment, may constrain the generation space (from which to generate the NLU hypothesis(es) 440), using the final top K data 930, the entity/KB data 1034, the user data 1036, and the skill data 1038 as inputs to an encoder 1120. The encoder 1120 may adopt a hierarchical structure to extract a hidden representation of the aggregated/combined foregoing data, enabling a decoder 1130 to perform cross attention using the encoded context data 1025. The decoder 1130 may adopt a heterogeneous memory network to generate a NLU hypothesis using portions of the dialog data 1105, portions of the final top K data 930, and portions of the other data (1034, 1036, and 1038). The second stage component 424, in this embodiment, may be trained based on cross entropy loss.

Figure 12:
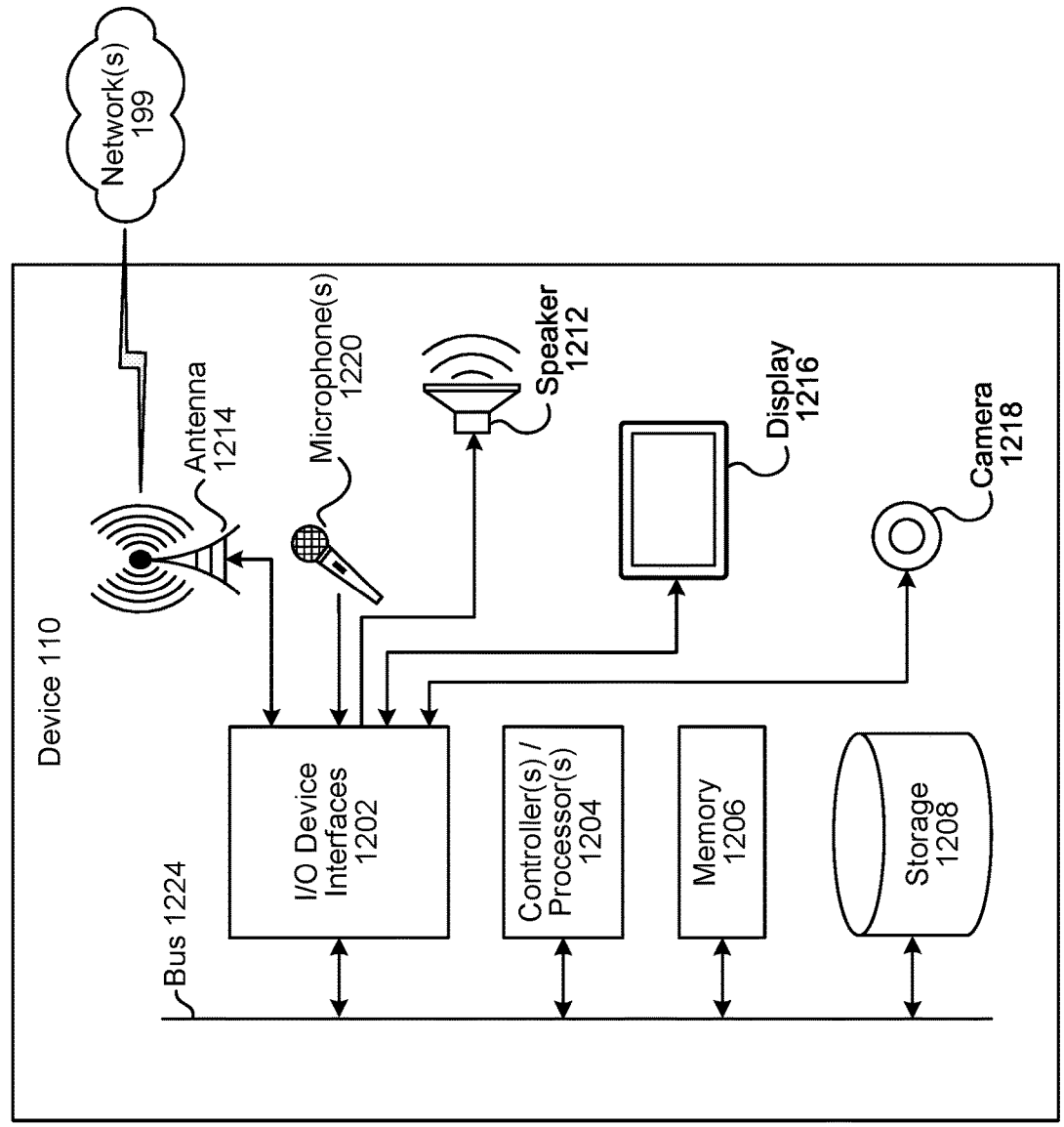
FIG. 12 is a block diagram conceptually illustrating example components of a device, according to embodiments of the present disclosure.
Figure 13:
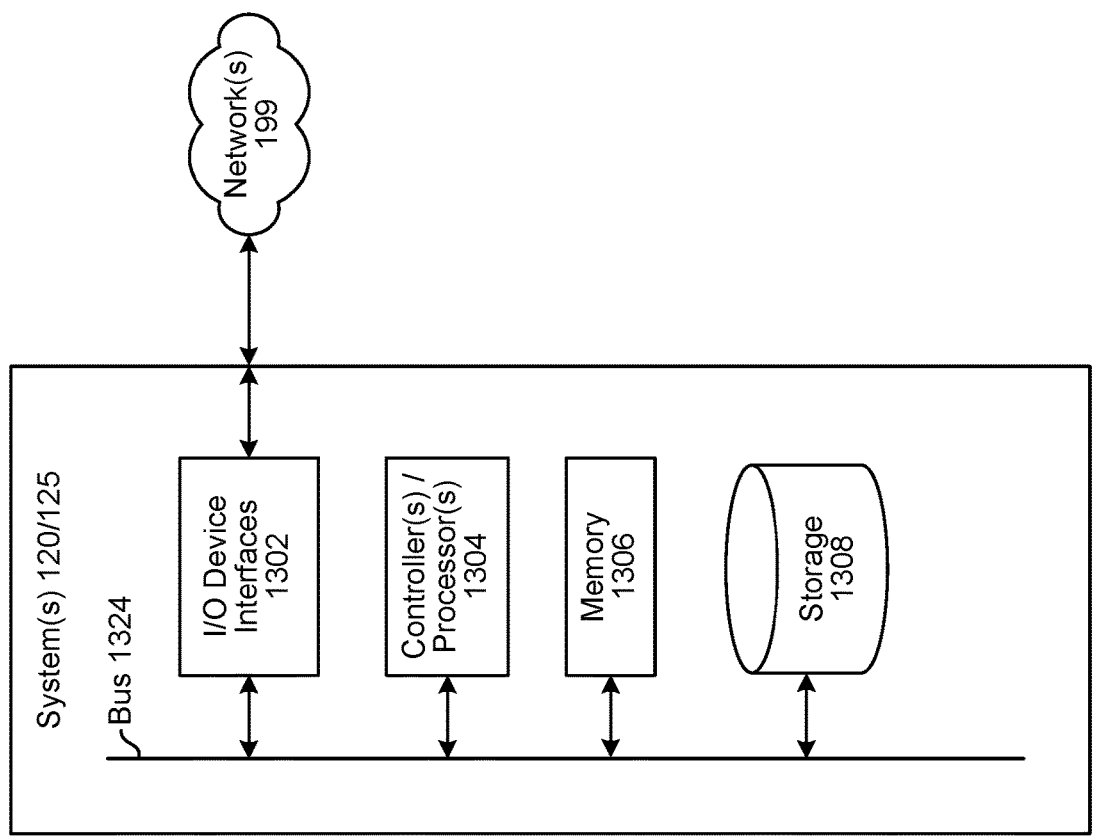
FIG. 13 is a block diagram conceptually illustrating example components of a system, according to embodiments of the present disclosure.

FIG. 12 is a block diagram conceptually illustrating example components of a device 110 according to the present disclosure. FIG. 13 is a block diagram conceptually illustrating example components of a system, such as the remote system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device 110, the remote system 120, and/or a skill system 125 may include their own dedicated processors, memory, and/or storage. Alternatively, one or more of the components of the device 110, the remote system 120, and/or a skill system 125 may utilize the I/O interfaces (1202/1302), processor(s) (1204/1304), memory (1206/1306), and/or storage (1208/1308) of the device(s) 110, remote system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and a skill system 125, as described herein, are illustrative, and may be located as a stand-alone device or may be included, in whole or in part, as a component of a larger device or system.

Figure 14:
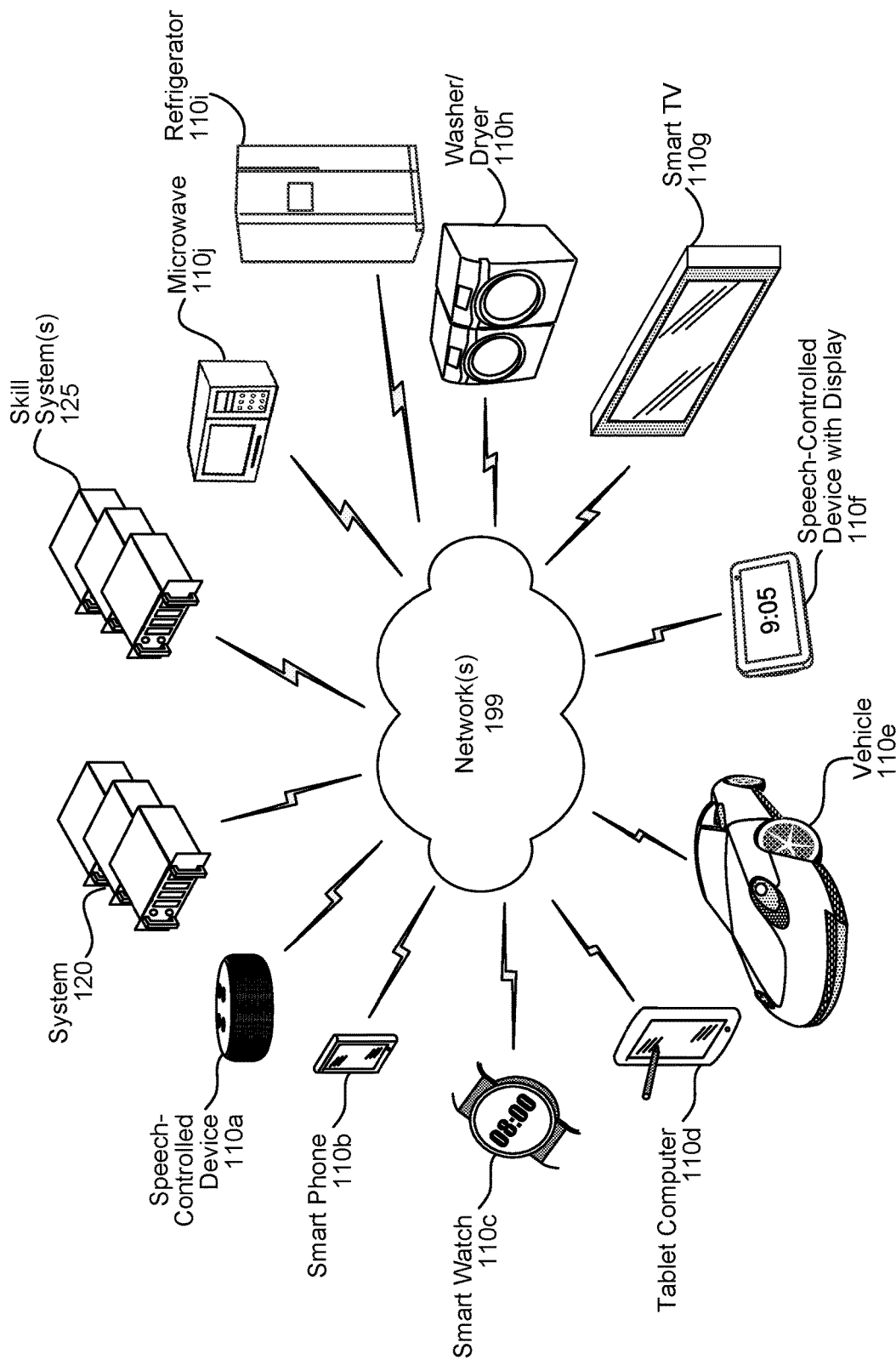
FIG. 14 illustrates an example of a computer network for use with the overall system, according to embodiments of the present disclosure.

As illustrated in FIG. 14, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the remote system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:
1. A computer-implemented method comprising:
receiving first interaction data corresponding to a first NLU hypothesis, the first interaction data corresponding to a plurality of users, the first interaction data including:
a first past user input, a first number of times the first past user input was received, and a second number of times the first past user input resulted in an undesired system response,
a first sample input that results in a desired system response, and
a first past system response, a third number of times the first past system response was outputted, and a fourth number of times the first past system response was an undesired system response;
receiving second interaction data corresponding to a second NLU hypothesis, the second interaction data corresponding to the plurality of users;
determining first encoded interaction data using the first interaction data;
determining second encoded interaction data using the second interaction data;
receiving dialog data corresponding to a dialog session, the dialog data including:
a first user input received from a device, and
a first system-generated response to the first user input, determining encoded dialog data using the dialog data;
processing the first encoded interaction data, the second encoded interaction data and the encoded dialog data to determine a first plurality of NLU hypotheses corresponding to a subsequent turn of the dialog session;
receiving context data corresponding to the dialog session;
processing the encoded dialog data, the first plurality of NLU hypotheses and the context data to select a third NLU hypothesis as corresponding to the subsequent turn;
determining output data using the third NLU hypothesis; and
sending the output data to the device.

2. The computer-implemented method of claim 1, wherein determining the first encoded interaction data comprises:
  determining, using a first encoder, first encoded data corresponding to the first past user input the first number of times, and the second number of times;
  receiving skill data corresponding to a skill invoked during the dialog session;
  determining, using a second encoder, second encoded data corresponding to the first sample input and the skill data;
  determining, using a third encoder, third encoded data corresponding to the first past system response; and
  determining the first encoded interaction data using the first encoded data, the second encoded data and the third encoded data.

3. The computer-implemented method of claim 1, further comprising:
  receiving third interaction data corresponding to a first user that provided the first user input;
  determining third encoded interaction data using the third interaction data;
  processing the encoded dialog data and the third encoded interaction data to determine a second plurality of NLU hypotheses corresponding to the subsequent turn;
  receiving fourth interaction data corresponding to a group of users including the first user;
  determining fourth encoded interaction data using the fourth interaction data;
  processing the encoded dialog data and the fourth encoded interaction data to determine a third plurality of NLU hypotheses corresponding to the subsequent turn;
  determining a fourth plurality of NLU hypotheses using the first plurality, the second plurality and the third plurality; and
  processing the fourth plurality and the context data to select the third NLU hypothesis.

4. A computer-implemented method comprising:
  receiving dialog data for a dialog session, the dialog data comprising a first user input and a first system-generated response to the first user input;
  receiving structured data representing first interaction data corresponding to a plurality of intents, the structured data including at least first data associated with a first intent, the first data comprising:
    a first past user input,
    a sample input, and
    a first past system response to the first past user input;
  determining encoded dialog data using the dialog data;
  determining first encoded interaction data using the structured data; and
  processing at least the encoded dialog data and the first encoded interaction data to determine a second intent corresponding to a predicted subsequent turn of the dialog session.

5. The computer-implemented method of claim 4, wherein receiving the structured data comprises receiving the structured data including the first data, the first data further comprising:
  a first number of times the first past user input is received from a plurality of users;
  a second number of times an undesired response is outputted in response to the first past user input;
  a third number of times the first past system response is outputted for the plurality of users; and
  a fourth number of times the first past system response is an undesired response.

6. The computer-implemented method of claim 5, further comprising:
  determining, using a first encoder, first encoded data corresponding to the first past user input, the first number of times and the second number of times;
  receiving skill data corresponding to a skill invoked during the dialog session;
  determining, using a second encoder, second encoded data corresponding to the sample input and the skill data;
  determining, using a third encoder, third encoded data corresponding to the first past system response; and
  determining first encoded interaction data using the first encoded data, the second encoded data and the third encoded data, the first encoded interaction data corresponding to the first intent.

7. The computer-implemented method of claim 4, wherein receiving the dialog data comprises receiving the dialog data further comprising:
  first word data corresponding to a first word of the first user input for a first turn of the dialog session, and
  second word data corresponding to a second word of the first system-generated response for the first turn;
  wherein the first word data comprises:
    first token data representing the first word;
    a first identity tag representing the first word corresponds to the first user input; and
    a first turn tag representing the first word corresponds to the first turn,
  wherein the second word data comprises:
    second token data representing the second word;
    a second identity tag representing the second word corresponds to the first system-generated response; and
    a second turn tag representing the second word corresponds to the first turn,
  the method further comprises:
    processing the first word data and the second word data using an encoder; and
    determining the encoded dialog data.

8. The computer-implemented method of claim 4, wherein receiving the dialog data comprises receiving the dialog data further comprising:
  first word data representing a first word of a first turn of the dialog session, and
  second word data representing a second word of a second turn of the dialog session; and
  the method further comprises:
    determining first turn data by processing the first word data using a first encoder;

determining second turn data by processing the second word data using a second encoder; and
determining the encoded dialog data using the first turn data and the second turn data.

9. The computer-implemented method of claim 4, further comprising:
processing the encoded dialog data and the first encoded interaction data to determine a first plurality of intents corresponding to the predicted subsequent turn, the first interaction data representing interactions between a system and a plurality of users;
receiving second interaction data represented in the structured data, the second interaction data representing interactions between the system and a first user that provided the first user input;
determining second encoded interaction data using the second interaction data;
processing the encoded dialog data and the second encoded interaction data to determine a second plurality of intents corresponding to the predicted subsequent turn;
receiving third interaction data represented in the structured data, the third interaction data representing interactions between the system and a group of users including the first user;
determining third encoded interaction data using the third interaction data; and
processing the encoded dialog data and the third encoded interaction data to determine a third plurality of intents corresponding to the predicted subsequent turn.

10. The computer-implemented method of claim 9, further comprising:
receiving context data corresponding to the dialog session;
processing the first plurality of intents, the second plurality of intents, the third plurality of intents and the context data; and
determining a fourth plurality of intents correspond to the predicted subsequent turn.

11. The computer-implemented method of claim 10, further comprising:
processing the fourth plurality of intents and the context data using an attention mechanism;
determining a ranked list of intents; and
selecting the second intent from the ranked list of intents.

12. The computer-implemented method of claim 4, further comprising:
determining output data using the second intent; and
sending the output data to a device during the predicted subsequent turn of the dialog session.

13. A system comprising:
at least one processor; and
at least one memory including instructions that, when executed by the at least one processor, cause the system to:
receive dialog data for a dialog session, the dialog data comprising a first user input and a first system-generated response to the first user input;
receive structured data representing first interaction data corresponding to a plurality of intents, the structured data including at least first data associated with a first intent, the first data comprising:
a first past user input,
a sample input, and
a first past system response to the first past user input;
determine encoded dialog data using the dialog data;
determine first encoded interaction data using the structured data; and
process at least the encoded dialog data and the first encoded interaction data to determine a second intent corresponding to a predicted subsequent turn of the dialog session.

14. The system of claim 13, wherein the first data further comprises:
a first number of times the first past user input is received from a plurality of users;
a second number of times an undesired response is outputted in response to the first past user input;
a third number of times the first past system response is outputted for the plurality of users; and
a fourth number of times the first past system response is an undesired response.

15. The system of claim 14, wherein the instructions that, when executed by the at least one processor, further cause the system to:
determine, using a first encoder, first encoded data corresponding to the first past user input, the first number of times and the second number of times;
receive skill data corresponding to a skill invoked during the dialog session;
determine, using a second encoder, second encoded data corresponding to the sample input and the skill data;
determine, using a third encoder, third encoded data corresponding to the first past system response; and
determine first encoded interaction data using the first encoded data, the second encoded data and the third encoded data, the first encoded interaction data corresponding to the first intent.

16. The system of claim 13, wherein the dialog data comprises:
first word data corresponding to a first word of the first user input for a first turn of the dialog session, and
second word data corresponding to a second word of the first system-generated response for the first turn;
wherein the first word data comprises:
first token data representing the first word;
a first identity tag representing the first word corresponds to the first user input; and
a first turn tag representing the first word corresponds to the first turn,
wherein the second word data comprises:
second token data representing the second word;
a second identity tag representing the second word corresponds to the first system-generated response; and
a second turn tag representing the second word corresponds to the first turn, and wherein the instructions that, when executed by the at least one processor, further cause the system to:
process the first word data and the second word data using an encoder; and
determine the encoded dialog data.

17. The system of claim 13, wherein the dialog data comprises:
first word data representing a first word of a first turn of the dialog session, and
second word data representing a second word of a second turn of the dialog session; and wherein the instructions that, when executed the at least one processor, further cause the system to:
determine first turn data by processing the first word data using a first encoder;

determine second turn data by processing the second word data using a second encoder; and determine the encoded dialog data using the first turn data and the second turn data.

18. The system of claim 13, wherein the instructions that, when executed by the at least one processor, further cause the system to:

process the encoded dialog data and the first encoded interaction data to determine a first plurality of intents corresponding to the predicted subsequent turn, the first interaction data representing interactions between a system and a plurality of users;

receive second interaction data represented in the structured data, the second interaction data representing interactions between the system and a first user that provided the first user input;

determine second encoded interaction data using the second interaction data;

process the encoded dialog data and the second encoded interaction data to determine a second plurality of intents corresponding to the predicted subsequent turn;

receive third interaction data represented in the structured data, the third interaction data representing interactions between the system and a group of users including the first user;

determine third encoded interaction data using the third interaction data; and process the encoded dialog data and the third encoded interaction data to determine a third plurality of intents corresponding to the predicted subsequent turn.

19. The system of claim 18, wherein the instructions that, when executed by the at least one processor, further cause the system to:

receive context data corresponding to the dialog session;

process the first plurality of intents, the second plurality of intents, the third plurality of intents and the context data; and determine a fourth plurality of intents correspond to the predicted subsequent turn.

20. The system of claim 19, wherein the instructions that, when executed by the at least one processor, further cause the system to:

process the fourth plurality of intents and the context data using an attention mechanism;

determine a ranked list of intents; and select the second intent from the ranked list of intents.

* * * * *